United States Patent [19]
Dreyer et al.

[11] Patent Number: 5,768,301
[45] Date of Patent: Jun. 16, 1998

[54] APPARATUS AND METHOD FOR DETECTING AND CORRECTING PAIR SWAP, AND IMPLEMENTING A LINK INTEGRITY FUNCTION IN A PACKET-BASED DATA COMMUNICATIONS SYSTEM

[75] Inventors: Stephen F. Dreyer, Los Altos; Robert X. Jin; Eric T. West, both of San Jose, all of Calif.

[73] Assignee: SEEQ Technology, Incorporated, Fremont, Calif.

[21] Appl. No.: 859,017

[22] Filed: May 20, 1997

Related U.S. Application Data

[62] Division of Ser. No. 698,374, Aug. 15, 1996.
[51] Int. Cl.$^6$ ............................................. G06F 11/00
[52] U.S. Cl. ................................................ 371/68.1
[58] Field of Search ................................ 371/68.1, 68.2, 371/70; 395/182.16; 341/68, 59, 102, 106

[56] References Cited

U.S. PATENT DOCUMENTS 5,614,901   3/1997   Haas ........................................... 341/68

*Primary Examiner*—Vincent P. Canney
*Attorney, Agent, or Firm*—D'Alessandro & Ritchie

[57] ABSTRACT

The present invention allows for the detection and correction of certain error conditions in packet-based data communications systems, including systems utilizing multiple channels or signal pairs, where all channels or signal pairs do not carry a link integrity signal or other repetitive non-data signal. A first aspect of the present invention provides detection and correction for reverse polarity. A second aspect of the present invention provides detection and correction for pair swap. A third aspect of the present invention provides a link integrity function. Detection of reverse polarity, detection of pair swap, and detection of link integrity utilizes the non-data components of received packets, either independently or in conjunction with a link integrity signal or other repetitive non-data signal. Reverse polarity is corrected by inverting the received signals prior to transmission or repetition to subsequent circuitry. Pair swap is corrected by switching the signals received on the swapped pairs prior to transmission or repetition to subsequent circuitry. Link integrity status is indicated via a transmitted signal.

32 Claims, 16 Drawing Sheets

| | |
|---|---|
| SOSA | [ 1 -1  1 -1  1 -1 ] |
| SOSB | [ 1 -1  1 -1 -1  1 ] |
| P3 | [ 1 -1 ] |
| P4 | [ 1 -1  1 -1 ] |
| | |
| DATA | 6T CODE GROUPS RESULTING FROM THE ENCODING OF BINARY DATA OCTETS. |
| | |
| EOP1 | [ 1  1  1  1  1  1 ] |
| EOP2 | [ 1  1  1  1 -1 -1 ] |
| EOP3 | [ 1  1 -1 -1  0  0 ] |
| EOP4 | [ -1 -1 -1 -1 -1 -1 ] |
| EOP5 | [ -1 -1  0  0  0  0 ] |

APPARATUS AND METHOD FOR DETECTING AND CORRECTING PAIR SWAP, AND IMPLEMENTING A LINK INTEGRITY FUNCTION IN A PACKET-BASED DATA COMMUNICATIONS SYSTEM

This is a divisional of patent application Ser. No.08/698,374, filed Aug. 15, 1996.

BACKGROUND OF THE INVENTION

1. The Field of the Invention

The present invention relates to data communications technology, and integrated circuit design for data communications technology. More particularly, the present invention relates to methods and devices to detect and correct for errors in data communications devices. Specifically, the invention relates to devices, and methods, and algorithms to detect and correct for reversed polarity, and/or detect and correct for pair swap, and/or implement a link integrity function in packet-based data communications systems. Applications of the invention relate to devices, and methods, and algorithms to detect and correct for reversed polarity, and/or detect and correct for pair swap, and/or implement a link integrity function in 100BASE-T4 Ethernet systems, and will be applicable to extensions of this technology.

2. The Prior Art

In any data communications system, the detection and correction of conditions that may adversely affect the reliability or utility of transmitted data is of paramount concern. Methods to detect and correct for such conditions are becoming increasingly complex as the speed and complexity of data communications technology accelerates.

A large portion of modern data communications systems utilize data packet technology. These systems present particular challenges for designers of methods which can detect and correct for erroneous conditions. In packet-based data communications, data signals or symbols are collected into groups rather than being transmitted continuously. These groups are commonly known as packets or frames. Data transmitted and received in a packet-based system will be sent and received as a series of packets rather than as a continuous signal. This obviates the need to establish a direct and continuous connection between the transmitter and receiver, allowing greater flexibility in network design. Unfortunately, this lack of a known and continuous signal also requires flexibility and reliability in the methods chosen to detect and correct for adverse conditions.

Three of the most common and most challenging error conditions for the designer of data communications systems, especially packet-based systems, are reversed polarity, pair swapping, and the lack of link integrity.

A. Reversed Polarity

At its core, data communications involves the sending and receiving of signals across transmission media. In many, if not most, cases, these signals will be in the form of varying electrical voltages; each voltage normally corresponds to a specific data symbol, such as zero (0) or one (1). As is well-known to those of ordinary skill in the art, in order to receive the same data as was transmitted in such situations, the polarity of the electrical signals must also be the same; if the polarity is reversed, different voltage values will be received. To the extent that the different voltage values correspond with data symbols, the received data will then be incorrect; if the different voltage values do not correspond with data symbols, then the received data will be garbled and unusable. Therefore, the detection and correction of reversed polarity in data communications systems is highly important.

Unfortunately, as is known to those of ordinary skill in the art, reversed polarity conditions can be difficult to detect and repair. Often, signal polarity is reversed during wiring or other hardware installation, making physical detection and correction especially problematic. Therefore, it would be useful if a receiver could detect and correct for reverse polarity itself, obviating the need for physical detection and correction.

Prior art methods for detecting reverse polarity conditions in packet-based data communication systems utilize what is known as the 'link integrity signal', 'link pulse', or 'heartbeat'.

As packet-based systems communicate data in packet form rather than by establishing a direct connection between the transmitter and receiver, there are periods when the transmitter, receiver, or both, are idle. This is commonly called the 'idle state'. It is well known to those of ordinary skill in the art that repetitive short patterns of signals can be used to maintain and monitor the status of such systems while in an idle state. These are typically known as link integrity signals, and have been well-established in 10BASE-T Ethernet systems.

The link integrity signal in a 10BASE-T system is defined as a repetitive pattern of signals corresponding to the data symbol pattern +1, 0. This pattern is typically transmitted every 8ms. As will be apparent to those of ordinary skill in the art, if the polarity is reversed, the link integrity signal would not correspond to +1, 0. Prior art methods which detect reverse polarity sense the incorrect link integrity signal pattern. The subsequent data received is then corrected by changing each received non-zero symbol into a +1.

The 100BASE-T4 Ethernet (known commonly as T4) system is defined by a Supplement to IEEE Standard 803.2u—1995, hereby incorporated by reference as if set forth fully herein. The T4 system utilizes four signal pairs. FIG. 1 depicts signal pair usage according to the 100BASE-T4 protocol. Three signal pairs, TX_D1 12, BI_D3 14, and BI_D4 16 are used for transmission, three, RX_D2 18, BI_D4 16, and BI_D3 14 for receiving. This is accomplished by using two pairs designated as unidirectional, TX_D1 12 and RX_D2 18 and two pairs designated as bi-directional, BI_D3 14 and BI_D4 16. As will be apparent to those of ordinary skill in the art, the transmission of link integrity signals over the bi-directional signal pairs 14, 16 would be problematic: the probability of signal collision would be exceedingly high. Thus, in the T4 system, link integrity signals are designated only for the unidirectional pairs TX_D1 12 and RX_D2 18. Therefore, the detection of reverse polarity conditions in packet-based data communications systems utilizing bi-directional signal pairs, such as T4, present special challenges.

In the T4 system, the link integrity signals on unidirectional pairs TX_D1 12 and RX_D2 18 are defined as a −1 +1 pattern of ternary symbols typically repeated every 1mS. Ternary signaling (where voltages correspond to three possible symbols: +1, −1, and 0) is designated in the T4 protocol to increase the bandwidth, or volume of data sent per unit of time.

No known prior art methods exist which implement detection and correction of reverse polarity in either 100BASE-T4 systems or packet-based data communications systems utilizing bi-directional signal pairs. Accordingly, there is a need for methods which can detect and correct for reverse polarity conditions in such systems.

B. Pair Swapping

A primary desire in the development of modern data communications systems is increasing the speed of data exchange while retaining data integrity and reliability. As the volume of data communicated increases, there is a corresponding desire for greater speed of transmission across a variety of media; more and more bits per second need to be transmitted and received. A major limitation preventing this increased speed is the reliability of data signaling at high speed. As is known to those of ordinary skill in the art, speed of transmission over current cost-effective media is limited by reliability, therefore limiting the overall speed of data communications.

A promising response to this limitation has been the use of multiple parallel signal pairs. Multiple parallel signal pairs, also known as multiple channels, allow transmission in parallel over multiple carriers rather than in series over a single transmission medium. The transmission speed is then approximately the product of the single signal pair rate and the number of signal pairs. As will be apparent to those of ordinary skill in the art, this allows a much higher transmission rate over conventional media. For example, with the advent of Fast Ethernet and other new communication technologies, multiple twisted pairs are widely used for achieving higher reliable communication speeds.

Despite their advantages in increasing effective transmission speed, multiple parallel signal pairs create their own potential problems, such as what is known as 'pair swapping'. Pair swapping, or 'pair swap', refers to the undesired replacement of one or more of a number of multiple parallel signal pairs with another. This will typically occur in cases of incorrect wiring or hardware installation, making physical detection and correction of such conditions particularly difficult.

Avoiding pair swap is very important to the reliability of multiple channel data communications. In most cases, data being transmitted over multiple signal pairs will be 'fanned' onto the multiple signal pair or multiple channel media in a specific ordering scheme. To reform the single data stream for use at the received end, this fanning process will be reversed. As will be apparent to those of ordinary skill in the art, pair swapping will destroy the specific ordering scheme of the fanning process, thereby garbling the received data. Therefore, it is important that pair swapping be detected and corrected.

The 100BASE-T4 Ethernet protocol (T4) uses four pairs of unshielded twisted pair cable to transmit data at 100 Mb/s. FIG. 1 depicts wire usage in the T4 system. When a T4 device transmits, three pairs, TX_D1 12, BI_D3 14, and BI_D4 16, are used for transmission of data—the fourth pair, RX_D2 18 is reserved for collision error signaling from the receiver.

The configuration of a packet in T4 is shown in FIG. 2A. In packet formation in T4, data octets (8 bits of binary data) are mapped into ternary groups (six ternary symbols), known as 6T code groups. This is known as 8B6T encoding, and is used to further increase the symbolic data rate. The 6T data code groups 66, 68, 70, 72, 74 are fanned onto the three transmitting signal pairs in cyclical order, beginning with pair BI_D4 56, then TX_D1 52, and then BI_D3 54, and again BI_D4 56 and so forth, as shown in FIG. 2A. This cyclical arrangement continues until all 6T code groups 66, 68, 70, 72, 74 have been impressed onto the signal pairs. At the receiving end, the single data stream will be reformed by removing the 6T data code groups 66, 68, 70, 72, 74 from the signal pairs in the reverse order from above. As will be apparent to those of ordinary skill in the art, the swapping of signal pairs in a T4 device will destroy the expected ordering of the 6T data code groups 66, 68, 70, 72, 74, and preclude the reception of useful data. Therefore, the detection and correction of pair swapping is an important and useful component of any data communications system, such as 100BASE-T4, utilizing multiple parallel signal pairs.

No known prior art exists describing a method for detecting and correcting for pair swapping in devices with multiple parallel signal pairs, such as those established by the 100BASE-T4protocol. Accordingly, there is a need for such methods.

C. Link Integrity Function

A 'link integrity function' refers to the ability of a data communications device to sense the presence (or lack thereof) of a proper data link between communication elements. A link integrity function will allow a device to indicate (perhaps though the use of external signaling mechanisms such as LEDs or through the use of software-based indicator mechanisms) that a link is or is not present. A link integrity function is invaluable in detecting broken, disconnected, or improperly installed wiring or other transmission media.

Prior art methods for implementing a link integrity function in packet-based data communication systems utilize the link integrity signal as described above.

The prior art method for implementing a link integrity function in a 10BASE-T system is simply to sense for the presence of the link integrity signal. If the link integrity signal is not detected, then the link integrity function indicates the lack of link integrity - a signaling mechanism may be implemented. As 10BASE-T systems use only two unidirectional signal pairs (one for transmitting and one for receiving), a link integrity signal is available on all signal pairs; thus, the link integrity function described above can be implemented on all signal pairs.

In contrast to the 10BASE-T protocol, and as noted above, the 100BASE-T4 protocol (T4) allows for link integrity signals on only the unidirectional signal pairs TX_D1 12 and RX_D2 18. Current methods for implementing a link integrity function use the presence of link integrity signals in a similar manner as that described for the 10BASE-T system above. That is, these methods for implementing a link integrity function in T4 sense for the presence of the link integrity signal on the received pair RX_D2 18. If the link integrity signal is not detected, then the link integrity function indicates the lack of link integrity—a signaling mechanism may be implemented to alert a system user or software program. Those methods which then establish link integrity for the other two received signal pairs, BI_D3 14 and BI_D4 16, do so by assumption: the methods assume that the presence or lack of a link integrity signal on RX_D2 18 indicates the link integrity status of bi-directional pairs BI_D3 14 and BI_D4 16. Essentially, the link integrity function implemented for RX_D2 18 is extrapolated for the entire trio of received signal pairs 14, 16, 18.

As will be apparent to those of ordinary skill in the art, the current methods for implementing a link integrity function in T4 (and systems such as T4—utilizing signal pairs without link integrity signals) are incomplete. While the current methods may function correctly in cases where, for example, the transmission media or wiring is completely broken or disconnected, it does not fully consider cases where individual signal pairs are damaged or disconnected. For illustration, a case where received signal pair RX_D2 18 is properly connected but received signal pair BI_D3 14 is not would not be correctly detected by the current methods.

Accordingly, there is a need for a method or methods for implementing a link integrity function on all received signal pairs or channels in data communications systems, such as 100BASE-T4 systems, where a link integrity signal is not utilized on all received signal pairs.

SUMMARY OF THE INVENTION

The present invention is an apparatus and method for detecting and correcting certain error conditions commonly encountered in modern data communications. There are three basic aspects to the present invention. First, the present invention provides an apparatus and method for detecting and correcting for reverse polarity in packet-based data communications systems. Second, the present invention also provides an apparatus and method for detecting and correcting for pair swap in packet-based data communications systems. And third, the present invention provides a link integrity function in packet-based data communications systems.

The present invention will be of particular use (though its use is not limited to) data communications systems, such as 100BASE-T4 Ethernet (T4) systems, which do not utilize a link integrity signal or other repetitive non-data signal on all channels or signal pairs. The present invention will also be especially useful (though, again its use is not limited to) data communications systems, such as 100BASE-T4 Ethernet (T4) systems, utilizing transmission and reception across multiple channels or signal pairs. Finally, applications of the present invention will be particularly suitable for (though not limited to) the 100BASE-T4 Ethernet (T4) system and other technologies, including future technologies which develop from or improve upon 100BASE-T4.

The present invention is based on the idea that, in a packet-based data communications system, data may be treated differently from the non-data components of the packet. These non-data components are often called the preamble and the end-of-packet delimiter (or EOP); it is through their use that the present invention is able to achieve accurate and effective detection and correction for reverse polarity, accurate and effective detection and correction for pair swap, and the implementation of a link integrity function.

I. DETECTION AND CORRECTION FOR REVERSE POLARITY

The invention detects reverse polarity by sensing either the end of the preamble (known as the start-of-stream-delimiter or SSD) or the EOP of each data packet. By definition, the SSD and EOP will have unique yet known symbol patterns; the invention will determine whether the expected symbol pattern, or the inverse of the expected symbol pattern (a +1 −1 pattern instead of a −1 +1 pattern, for example) is present: thus indicating correct or reversed polarity. The invention will correct for the reverse polarity by inverting subsequently received symbols (a received +1 will be changed to a −1 and a received −1 will be changed to a +1, in the T4 case), both data and non-data. Thus, the received packet, though initially received in a reverse polarity and possibly unusable form, can be fully and seamlessly utilized by the remainder of the receiving device.

II. DETECTION AND CORRECTION FOR PAIR SWAP

The invention detects pair swap by using a combination of link integrity signals and non-data components of the packet (the preamble and EOP). In multiple channel or signal pair systems such as T4, one or more channels or signal pairs are designated to have a link integrity signal; these channels are identified on this basis. If the identified channel is not on the expected transmission medium (such as a particular twisted pair), then it is considered 'swapped', and the subsequent data on that transmission medium will be switched to the correct channel. On channels without link integrity signals, the non-data components of the packets are used: either the ordering or separation of known symbol patterns in the preamble or EOP are used to identify individual channels or signal pairs. If an identified channel is not on the expected transmission medium, then it is considered 'swapped', and the subsequent data on that transmission medium will be switched to the correct channel. Thus, the invention can both detect and correct for pair swap conditions on signal pairs utilizing a link integrity signal as well as on signal pairs without a link integrity signal.

III. IMPLEMENTATION OF A LINK INTEGRITY FUNCTION

The invention implements a link integrity function by utilizing both the link integrity signal and the non-data components of a packet. In systems with multiple channels or signal pairs where at least one channel is defined with a link integrity signal, such as T4, the link integrity of channels with a link integrity signal is established by sensing the presence of a link integrity signal. If the link integrity signal is not detected, then link integrity is determined not to be present. The link integrity of the remaining channels or signal pairs (those without link integrity signals) is then established by detecting the presence of valid packet preambles within a known time period. As the protocol establishing a multiple channel data communications standard, such as that defining T4, designates the maximum delay between channels, a channel's link integrity status will be established if a valid packet preamble arrives within a known window of time of a valid packet preamble on a channel or signal pair determined to have link integrity (such as those channels with link integrity signals). Thus, the invention implements a link integrity function for all channels, even for those without link integrity signals.

The invention allows advanced data communications systems to implement useful and important error detection and correction mechanisms in a simple and efficient manner. The invention also allows advanced data communications systems to implement useful and important error detection and correction mechanisms despite factors, such as multiple channel transmission or the lack of link integrity signals on each channel or signal pair, which forestall prior methods.

As will be apparent to those of ordinary skill in the art after reading the disclosure herein, this invention is easily applicable to data communications systems utilizing packet-based technology. This invention will be particularly valuable in data communications systems utilizing multiple parallel channels or signal pairs, and/or those systems which do not utilize link integrity signals on each channel or signal pair. The invention is also especially applicable to systems designed to utilize the 100BASE-T4 Ethernet (T4) protocol, and will be equally applicable to extensions and developments of this technology.

OBJECTS AND ADVANTAGES OF THE INVENTION

Accordingly, it is an object and advantage of the present invention to provide an improved apparatus and method to detect and correct for reversed polarity, and/or detect and correct for pair swap, and/or implement a link integrity function in a packet-based data communications system.

It is a further object and advantage of the present invention to provide an improved method to detect and correct for reversed polarity, and/or detect and correct for pair swap, and/or implement a link integrity function in a data communications system utilizing multiple channels or signal pairs.

It is a further object and advantage of the present invention to provide an improved method to detect and correct for reversed polarity, and/or detect and correct for pair swap, and/or implement a link integrity function in a data communications system where link integrity signals or other constant signaling mechanisms are not used on all channels.

It is a further object and advantage of the present invention to utilize non-data components of received packets to detect and correct for reverse polarity, and/or detect and correct for pair swap, and/or implement a link integrity function in a data communications device.

It is a further object and advantage of the present invention to utilize the preambles of received packets to detect and correct for reverse polarity, and/or detect and correct for pair swap, and/or implement a link integrity function in a data communications device.

It is a further object and advantage of the present invention to utilize the end-of-packet delimiters of received packets to detect and correct for reverse polarity, and/or detect and correct for pair swap, and/or implement a link integrity function in a data communications device.

It is a further object and advantage of the present invention to utilize the preambles of received packets and link integrity signals to detect and correct for reverse polarity, and/or detect and correct for pair swap, and/or implement a link integrity function in a data communications device.

It is a further object and advantage of the present invention to provide an improved method to detect and correct for reversed polarity, and/or detect and correct for pair swap, and/or implement a link integrity function suitable for use in a system designed to the 100BASE-T4 protocol.

It is a further object and advantage of the present invention to utilize non-data components of received packets to detect and correct for reversed polarity, and/or detect and correct for pair swap, and/or implement a link is integrity function in a system designed to the 100BASE-T4 protocol.

It is a further object and advantage of the present invention to utilize the preambles of received packets to detect and correct for reversed polarity, and/or detect and correct for pair swap, and/or implement a link integrity function in a system designed to the 100BASE-T4 protocol.

It is a further object and advantage of the present invention to utilize the end-of-packet delimiters of received packets to detect and correct for reversed polarity, and/or detect and correct for pair swap, and/or implement a link integrity function in a system designed to the 100BASE-T4 protocol.

It is a further object and advantage of the present invention to utilize the preambles of received packets and link integrity signals to detect and correct for reversed polarity, and/or detect and correct for pair swap, and/or implement a link integrity function in a system designed to the 100BASE-T4 protocol.

DESCRIPTION OF A PREFERRED EMBODIMENT

Figures 1, 2B:
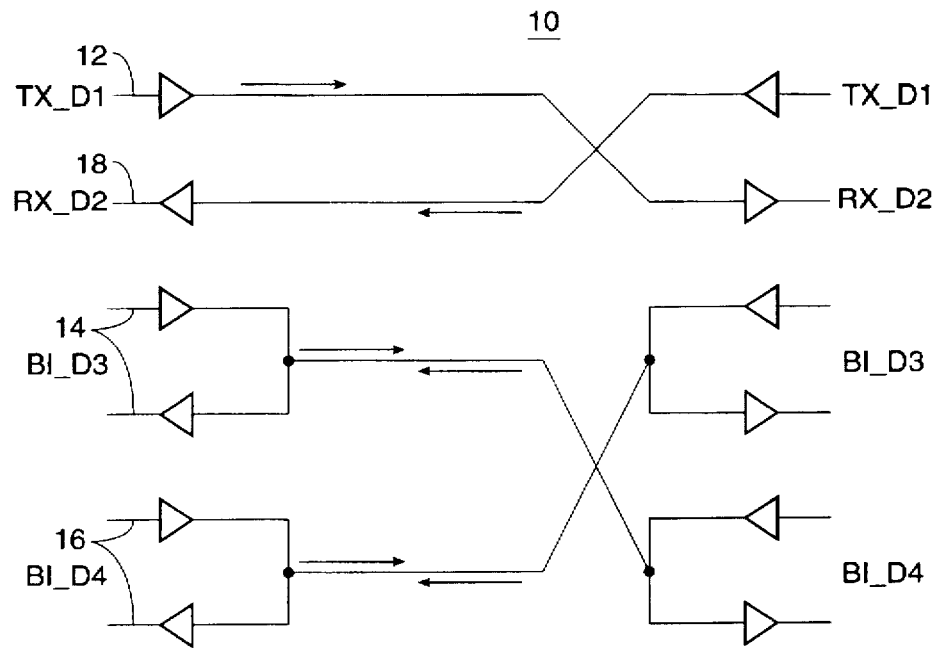
FIG. 1 is a diagram of the wire usage according to the 100BASE-T4 Ethernet protocol, showing the use of four signal pairs.
FIG. 2B lists the ternary symbol definitions of the ternary code groups which comprise the non-data components of packets in the 100BASE-T4 Ethernet system.

Those of ordinary skill in the art will realize that the following description of the present invention is illustrative only and not in any way limiting. Other embodiments of the invention will readily suggest themselves to such skilled persons.

I. INTRODUCTION: PACKET-BASED DATA COMMUNICATIONS

In order to preserve data addressing and integrity, as well as to allow data communications receivers to implement functions such as alignment and recovery, it is common practice in the art to encapsulate data being sent in a packet form: for a given group of data, signals or symbols designating the start of a packet are added before the data signals or symbols; signals or symbols designating the end of a packet are added after the data signals or symbols. Therefore, a packet will typically include data signals or symbols 'surrounded' by non-data signals or symbols. Packets, then, will be comprised of both data components or elements and non-data components or elements.

The pre-data packet components or elements (comprised of non-data signals or symbols) are typically used (among other functions) to designate the presence of the following data, and are commonly known as preambles. Those of ordinary skill in the art will recognize that the term 'preambles' used in this context is intended to be inclusive; as such, it includes other common terms for pre-data packet components or elements, such as: start-of-stream delimiter (SSD), start-of-frame delimiter (SFD), and start-of-stream (SOS), for example. The inventive concepts herein, as will be understood by one of ordinary skill in the art, are equally effective and applicable to preambles (pre-data packet components or elements) of any length or type.

The after-data packet components or elements (comprised of non-data signals or symbols) are typically used (among other functions) to designate the end of the packet, and are commonly known as end-of-packet delimiters, or EOPs. Those of ordinary skill in the art will recognize that the terms 'end-of-packet delimiters' or 'EOPs' 'preambles' used in this context are intended to be inclusive; as such, they include other common terms for after-data packet components or elements. The inventive concepts herein, as will be understood by one of ordinary skill in the art, are equally effective and applicable to EOPs (after-data packet components or elements) of any length or type.

In summary, therefore, the packet-type geometry may be generally described:

<PREAMBLE><DATA><EOPs>

It is well-known to those of ordinary skill in the art that the non-data components of a packet (both the preamble and the EOPs) may be used to carry important non-data information about the packet, such as timing, length, addressing information, and error status, for example.

The present invention uses these non-data components of a packet to allow for implementation of error detection and correction methods in data communications systems. The invention achieves flexibility through the idea that the non-data components of the packet can be treated differently from the data components. Because the non-data components, whether the preamble or the EOPs, have known properties (patterns of data symbols, length, and timing), these components may be used as the basis for implementing the reverse polarity detection and correction, pair swap detection and correction, and the link integrity function.

The present invention will be particularly valuable in data communications systems utilizing multiple channels or signal pairs for transmission.

II. DETECTION AND CORRECTION OF REVERSE POLARITY

A. Detection and Correction of Reverse Polarity: Using Non-Data. Components of Received Packets FIG. 3 describes a method for detecting and correcting for reverse polarity according to the present invention. As reverse polarity conditions arise in relation to a single signal pair or channel only, the depiction in FIG. 3 is of a method suitable for one signal pair or channel; those of ordinary skill in the art will recognize that multiple signal pairs or channels could be operated upon by the method in FIG. 3 by replicating the method for as many signal pairs or channels required.

Figure 3:
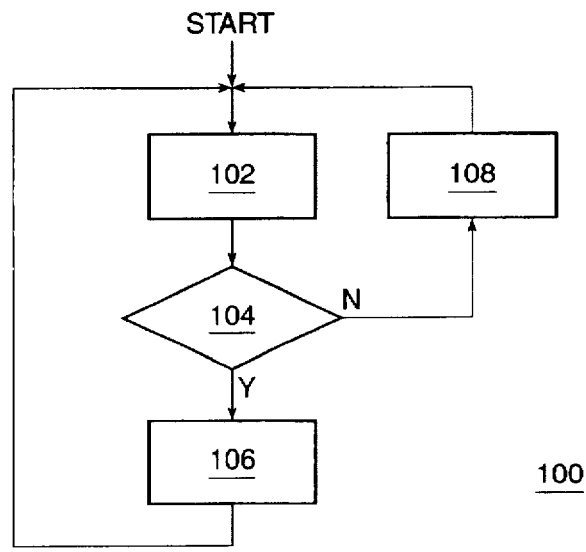
FIG. 3 is a diagram showing a method for detecting and correcting for reverse polarity according to the present invention.

Turning to FIG. 3, a method for detection and correction of reverse polarity 100 is shown. The method 100 includes a step of detecting the non-data components of the packet 102, a step of determining whether the non-data components are in an inverted state 104, a step of passing the data to subsequent circuitry in inverted form 106, and a step of passing the data to subsequent circuitry unchanged 108.

The step of detecting the non-data components of the packet 102 will use the principle discussed above—that the known and expected non-data symbols (or signals) can be easily differentiated from the data components of the packet.

The step of determining whether the non-data components are in an inverted state 104 will compare the received patterns of non-data components with the expected patterns. If the received patterns meet the expected patterns, then the packet will be deemed to have the correct polarity. If, however, the received patterns of non-data components indicate reversed polarity (such as inverted voltage or data symbols, or particular symbol or signal patterns indicating reverse polarity), then the packet will be deemed to have reverse polarity. The step of determining whether the non-data components are in an inverted state 104 will determine the way in which the packet is passed to the subsequent circuitry.

The step of passing the packet to subsequent circuitry unchanged 108 is preferably accomplished by passing the received packet along to subsequent circuitry or devices unchanged, though another suitable mechanism (such as a transmitter or repeater mechanism) could also be used, as would be apparent to those of ordinary skill in the art. The step of passing the packet to subsequent circuitry in inverted form 106 is accomplished by changing (or 'inverting') each received symbol into its inverse (changing received −1 symbols into +1 symbols, as an example), and passing the inverted symbols to subsequent circuitry, though another suitable mechanism (such as a transmitter or repeater mechanism) could be used, as would be apparent to those of ordinary skill in the art. As the symbol 0 is unaffected by reverse polarity, received 0 symbols are unaffected by inverting the packet symbols 106. As will be apparent to those of ordinary skill in the art, separate devices or circuits could be used to accomplish these steps—one for passage in inverted form 106, and one for passage in non-inverted form 108—and the data packets could be routed appropriately by the step of determining whether the non-data components are in an inverted state 104. Alternatively, the same device or circuit could be used for both functions 106, 108, with the device or circuit having the ability to send inverted signals 106 upon the assertion of means for determining whether the non-data components are in an inverted state 104.

Typical operation of the method for detection and correction of reverse polarity 100 will be as follows. As a packet is received, the non-data components are detected by the step of detecting the non-data components of the packet 102.

The step of determining whether the non-data components are in an inverted state 104 will determine whether the polarity of the received packet is reversed: if the polarity is reversed, then the packet will be corrected by being inverted as it is passed along 106; if the polarity is not reversed, the packet will be passed along without inversion 108. In either case 106, 108, the detection and correction cycle will begin again with the next received packet.

B. Detection and Correction of Reverse Polarity: An Alternative Method

Figure 4:
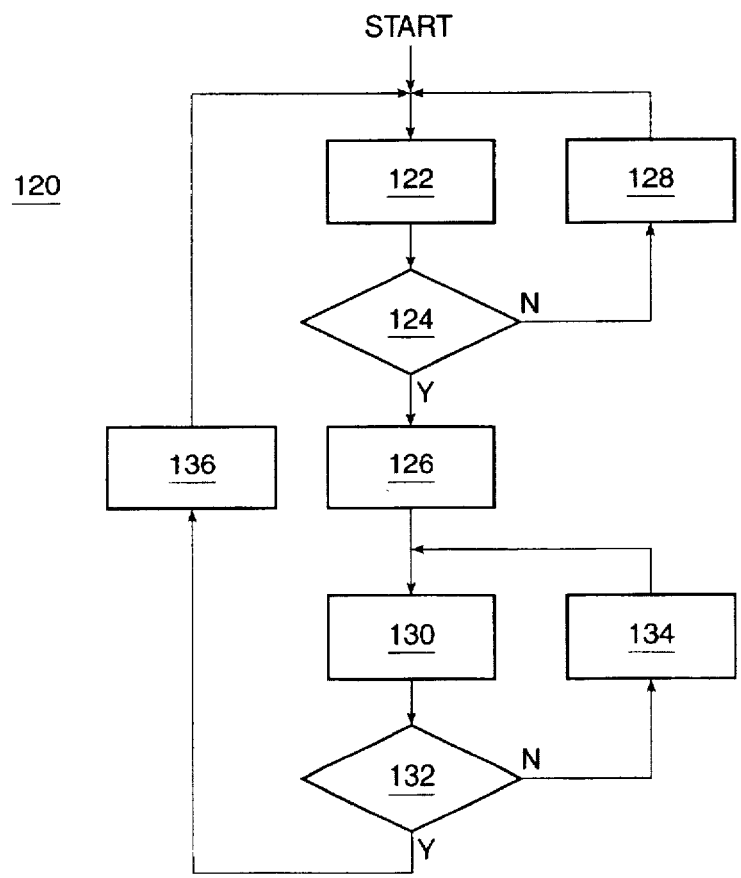
FIG. 4 is a diagram showing an alternative method for detection and correction of reverse polarity using non-data components of a packet.

FIG. 4 depicts an alternative method for detection and correction of reverse polarity using non-data components of a packet. As reverse polarity conditions arise in relation to a single signal pair or channel only, the depiction in FIG. 4 is a method suitable for one signal pair or channel; those of ordinary skill in the art will recognize that multiple signal pairs or channels could be operated upon by the method in FIG. 4 by replicating the method for as many numbers of signal pair s or channels required.

Turning to FIG. 4, an alternative method for detection and correction of reverse polarity 120 is shown. The method 120 includes: a first step of detecting the non-data components of the packet 122, a first step of determining whether the non-data components are in an inverted state 124, a first step of passing the packet to subsequent circuitry in inverted form 126, a first step of passing the packet to subsequent circuitry unchanged 128, a second step of detecting the non-data components of the packet 130, a second step of determining whether the non-data components are in an inverted state 132, a second step of passing the packet to subsequent circuitry in inverted form 134, and a second step of passing the packet to subsequent circuitry unchanged 136.

These steps will operate in the same manner as those described for FIG. 3 above.

Typical operation of the alternative method for detection and correction of reverse polarity 120 will be as follows. As a packet is received, the non-data components are detected by the first step of detecting the non-data components of the packet 122. The first step of determining whether the non-data components are in an inverted state 124 will determine whether the packet is in a reversed polarity state: if the polarity is reversed, then the packet will be inverted as it is passed to subsequent circuitry 126; if the polarity is not reversed, the packet will be passed to subsequent circuitry un changed 128, and the detection cycle will begin anew with the next received packet. If the packet is sent in an inverted form 126, then the next received packet will be detected by the second step of detecting the non-data components of the packet 130. The second step of determining whether the non-data components are in an inverted state 132 will determine whether the packet is in a reversed polarity state: if the polarity is not reversed, then the packet will be passed along to subsequent circuitry unchanged 136, and the detection cycle will begin again with the next received packet; if the polarity is reversed, then the packet will again be inverted as it is passed along 134, and the next received packet will be detected by the second step of detecting the non-data components of the packet 130.

C. Detection and Correction of Reverse Polarity: Including a Means for Increasing the Certainty of Error Detection and Correction In many cases of error detection and correction, such as detection and correction of reversed polarity, it is desirable to include in the methods and devices a means for increasing the certainty of such error detection. That is, it may be desirable to include mechanisms or methods that will allow actions resulting from error detection (inverting packets in response to reverse polarity, for example) to be undertaken in conditions of higher certainty. The present invention's flexibility allows the inclusion of such means for increasing the certainty of error detection.

Figure 5:
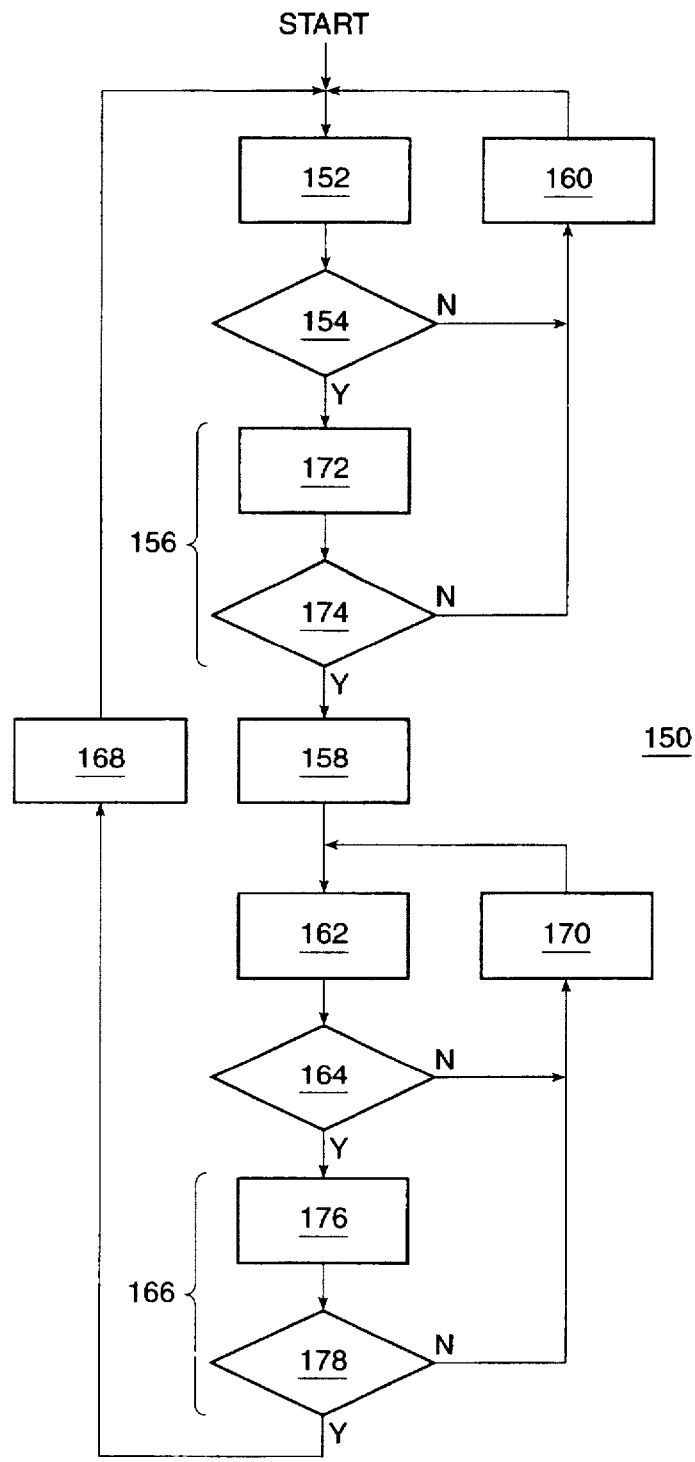
FIG. 5 is a diagram showing an alternative method for detection and is correction of reverse polarity, including a step of increasing the certainty of error detection.

FIG. 5 depicts an alternative method for detection and correction of reverse polarity, including a step of increasing the certainty of error detection. As reverse polarity conditions arise in relation to a single signal pair or channel only, the depiction in FIG. 5 is a method suitable for one signal pair or channel; those of ordinary skill in the art will recognize that multiple signal pairs or channels could be operated upon by the method in FIG. 5 by replicating the method for as many numbers of signal pairs or channels required.

Turning now to FIG. 5, the alternative method for detection and correction of reverse polarity, including a step of increasing the certainty of error detection 150 comprises: a first step of detecting the non-data components of the packet 152, a first step of determining whether the non-data components are in an inverted state 154, a first step of increasing the certainty of error detection 156, a first step of passing the data to subsequent circuitry in inverted form 158, a first step of passing the data to subsequent circuitry unchanged 160, a second step of detecting the non-data components of the packet 162, a second step of determining whether the non-data components are in an inverted state 164, a second step of increasing the certainty of error detection 166, a second step of passing the data to subsequent circuitry in inverted form 170, and a second step of passing the data to subsequent circuitry unchanged 168.

The steps of detecting the non-data components of the packet 152, 162, the steps of determining whether the non-data components are in an inverted state 154, 164, steps of passing the data to subsequent circuitry in inverted form 158, 170, and steps of passing the data to subsequent circuitry unchanged 160, 168 will operate in the same manner as those described for FIG. 3 and FIG. 4 above.

In the preferred embodiment of an alternative method for detection and correction of reverse polarity, including a step of increasing the certainty of error detection 150, the steps of increasing the certainty of error detection 156, 166 are based on a principle of repeatability. That is, the method assumes that the repetition of packets with reverse polarity will increase the certainty that the detection of reverse polarity is correct. This will serve to compensate for occasional bad bits of data transmitted, and for signal noise which might otherwise cause incorrect detection of reverse polarity. Thus, the steps of increasing the certainty of error detection 156, 166 are comprised of steps of incrementing a counter 172, 176, and steps of determining whether the counter value has reached a desired limit 174, 178. As will be apparent to those of ordinary skill in the art, the counter value limit used by the steps of determining whether the counter has reached a desired limit 174, 178 will be limited only by the desired application; in this embodiment the limit is preferably three.

Typical operation of the alternative method for detection and correction of reverse polarity, including a step of increasing the certainty of error detection 150 will be the following. As a packet is received, the non-data components are detected by the first step of detecting the non-data components of the packet 152. The first step of determining whether the non-data components are in an inverted state 154 will determine whether the packet is in a reversed polarity state: if the polarity is not reversed, the packet will be passed to subsequent circuitry unchanged 160, and the non-data components of the next packet will again be detected by the first step of detecting the non-data components of the packet 152. If, however, the polarity is reversed, then the first step of increasing the certainty of error detection 156 will increment a first counter 172, and determine whether the counter value limit has been reached 174. If the counter limit has not been reached, indicating that the certainty of error detection is not sufficient, the packet will be passed to subsequent circuitry unchanged 160, and the non-data components of the next packet will again be detected by the first step of detecting the non-data components of the packet 152. If the counter limit has been reached, indicating that the certainty of error detection is sufficient, then the packet will be passed to subsequent circuitry in inverted form 158, the first counter value will be reset to zero, and the next packet will have its non-data components detected by the second step detecting the non-data components of a packet 162. The second step of determining whether the non-data components of the packet are in an inverted state 164 will determine whether the packet is in a reversed polarity state: if the packet is in a reversed polarity state (in the same state as the previous packet) then the packet will again be passed in inverted form 170, and the next packet will have its non-data components detected by the second step detecting the non-data components of a packet 162. If, however, the polarity is determined not to be reversed, then the second a step of increasing the certainty of error detection 166 will increment a second counter 176, and determine whether the second counter limit has been reached 178. If the second counter limit has not been reached, indicating that the certainty of error detection is not sufficient, the packet will again be passed in inverted form 170, and the next packet will have its non-data components detected by the second step detecting the non-data components of a packet 162. If the counter limit has been reached, indicating that the certainty of error detection is sufficient, then the packet will be passed in non-inverted form 168, the second counter value will be reset to zero, and the non-data components of the next packet will again be detected by the first step of detecting the non-data components of the packet 152, beginning the cycle again.

D. Detection and Correction of Reverse Polarity: Application in 100BASE-T4 Ethernet Systems A possible application of the present invention is as an implementation of reverse polarity detection and correction in an 100BASE-T4 Ethernet system.

The 100BASE-T4 protocol (T4) establishes packet-based data communications at 100 Mbs. The T4 protocol is specified by a Supplement to IEEE 802.3u-1995; Clause 23 of IEEE 802.3u-1995, hereby incorporated by reference as if fully set forth herein, defines the physical layer (PHY) between the media and the Ethernet controller of the device.

T4 calls for transmission and reception across four pairs of unshielded twisted pair cable. See FIG. 1 for a depiction of wire usage in a T4 system. When a T4 device transmits, through the PHY, three signal pairs, TX_D1 12, BI_D3 14, and BI_D4 16, are used for transmission and the fourth pair, RX_D2 18 on the transmitted end, is reserved for the reception of a collision signal from the remote receiver. When a T4 PHY receives, three pairs, RX_2 18, BI_D4 16, and BI_D3 14, are used for reception, while the fourth TX_D1 12 on the received end, is reserved to transmit a collision signal to the remote transmitter. Therefore, as known to those of ordinary skill in the art, a T4 device can transmit or receive, but never both at the same time.

Wire usage according to the 100BASE-T4 protocol is shown in FIG. 1. The signal pairs TX_D1 12 and RX_D2 14 are known as unidirectional signal pairs-signals are sent across them in only one direction (as depicted in FIG. 1). Signal pairs BI_D3 16 and BI_D4 18 are bi-directional; they may be used in either direction.

FIG. 2 shows the format of the 100BASE-T4 data packets 50 as received on the three received signal pairs RX_D2 52, BI_D4 54, and BI_D3 56. The data packets are comprised of 'code groups', or groups of data symbols. In this case, the code groups are known as 6T code groups, and are themselves comprised of a set of six ternary signals. Ternary signals differ from the more common binary signals in that there are three possible voltage levels, corresponding to three possible data symbols, whereas binary signaling uses only two. A 6T code group is created by encoding an octet (8 bits) of binary data according to a coding scheme known as 8B6T coding.

Turning again to FIG. 2., the preamble portion of the data packets consists of a known series of code groups. On received pair RX_D2 52, the preamble consists of two repetitive SOSA code groups 58 and a SOSB code group 64. On received pair BI_D4 54, the preamble consists of a P3 code group 60, two repetitive a SOSA code groups 58 and an SOSB code group 64. The received pair BI_D3 56 preamble consists of a P4 code group, a SOSA code group 58, and a SOSB code group 64. The final octet, or 6T code group, of the preamble in T4 is known as the Start of Stream Delimiter (SSD). The SSD is an SOSB code group 64.

After the packet preamble, the data, encoded in 6T code groups 66, 68, 70, 72, 74, 76, is 'fanned' onto the three signal pairs 52, 54, 56. Data is impressed on the signal pairs 52, 54, 56 in a specific ordering scheme. The first data group (DATA_1) 66 is sent on received signal pair BI_D3 56; the others follow in a repetitive cyclical pattern. Thus, the second data group (DATA 2) 68 is fanned onto received signal pair RX_D2 52, the third (DATA_3) 70 is sent on received signal pair BI_D4 54, and so forth.

After all data code groups are impressed onto the signal pairs 52, 54, 56, the end of packet delimiters (EOPs) are appended to the packet. The ordering of the EOPs will follow the same ordering as used for the data groups. Thus, after the final data code group (DATA N) 74 is placed on a signal pair (received signal pair BI_D4 54 in the example shown in FIG. 2A), the first EOP (EOP_1) 76 is placed on the next signal pair in repetitive cyclical order (received signal pair BI_D3 56 in FIG. 2A). The second EOP (EOP_2) 78 is then placed, followed by the third (EOP_3) 80, fourth (EOP_4) 82, and fifth (EOP_5) 84, which completes the packet.

It will be apparent to those of ordinary skill in the art that the length of the data sent in a particular packet (and therefore the number of 6T data code groups 66, 68, 70, 72, 74, 76) will not be known in advance of the receipt and decoding of the packet. Therefore, the particular signal pair 52, 54, 56 that each EOP code group 76, 78, 80, 82, 84 will be sent upon is not known. However, as the ordering system is clearly defined, it is known that the first EOP (EOP_1) 76 and the fourth EOP (EOP_4) 82 will always be on the same signal pair 52, 54, 56 in consecutive order. Additionally, the second EOP (EOP_2) 78 and the fifth EOP (EOP_5) 84 will also be sent consecutively on the same signal pair 52, 54, 56 (though a different signal pair 52, 54, 56 from that containing the EOP_1 76/EOP_4 82 combination).

Each of the code groups used in the non-data components of a T4 packet is defined by a specific series of ternary signals. The ternary symbols corresponding to the code groups are shown in FIG. 2B. For example, the SOSA code group 58 is defined as the series of ternary symbols +1 −1 +1 −1 +1 −1.

The 100BASE-T4 protocol also defines a link integrity signal for received signal pair RX_D2 18. This link integrity signal is a pattern of −1 +1 ternary symbols repeated every 1 ms.

By viewing the preamble code groups in terms of their data symbols, it is possible to construct the expected pattern of symbols in a packet preamble on each signal pair 52, 54, 56. Thus, for example, the RX_D2 signal pair 52 preamble would be (in terms of symbols): +1 −1 +1 −1 +1 −1 +1 −1 +1 −1 +1 −1 +1 −1 +1 −1 +1 −1 +1. The EOPs can be viewed in a similar fashion as well. The signal pair 52, 54, 56 containing the first 76 and fourth 82 EOPs (EOP_1 76 and EOP_4 82) would have the following final symbols of the packet: +1 +1 +1 +1 +1 +1 −1 −1 −1 −1 −1 −1. These known patterns of symbols in the non-data components of a packet are the basis of the present invention.

By utilizing the known patterns of symbols in the non-data components of the packet, detection of reverse polarity on the T4 signal pairs 52, 54, 56 can be accomplished in the following manner. First, the expected preamble symbol pattern on the RX_D2 pair 52, as noted above, is <SOSA><SOSA><SOSB>, or +1 −1 +1 −1 +1 −1 +1 −1 +1 −1 +1 −1 +1 −1 −1 +1; the expected preamble symbol pattern on the BI_D4 pair 54 is <P3><SOSA><SOSA><SOSB>, or +1 −1 +1 −1 +1 −1 +1 −1 +1 −1 +1 −1 +1 −1 +1 −1 +1 −1 −1 +1; the expected preamble symbol pattern on the BI_D3 pair 56 is <P4><SOSA><SOSB>+1 −1 +1 −1 +1 −1 +1 −1 +1 −1 +1 −−1 −1 +1 −1 −1 +1. Thus, regardless of signal pair 52, 54, 56, the receiving device should receive a repetitive pattern of +1 −1 symbols until the −1 −1 symbols in the SOSB 64 or SSD. Reverse polarity is detected if a +1 +1 pattern is detected instead of the −1 −1. In the currently preferred embodiment, if a +1 +1 in the preamble (more particularly, in the SOSB 64 or SSD) of a packet is detected three packets in a row on a particular signal pair 52, 54, 56, then that signal pair is deemed to have reverse polarity. The three-packet requirement is the means for increasing the certainty of error detection, and is implemented to eliminate the false detection of reverse polarity due to signal noise or bad bits. The means for increasing the certainty of error detection, however, is not to be considered an essential element of the invention; those of ordinary skill in the art will realize that different requirements could also be used to reduce the probability of false detection. Those of ordinary skill in the art will also realize that the selection of three packets as the required level of certainty is not a limitation: the required level of certainty could be set to n packets, where n is any number, without departing from the inventive concepts herein.

If a particular signal pair 52, 54, 56 is determined to have reverse polarity, then the packet which comprises the third reversed packet in a row (in this case) and subsequently received packets will be inverted and then passed to subsequent devices. If later-received packets have correct polarity, then the device can pass packets to subsequent devices or circuitry unchanged. Thus, the data, even received initially with reversed polarity, can still be used effectively.

Once a signal pair 52, 54, 56 has been determined to be in reversed polarity, then, as noted above, subsequent packets will be 'expected' to be in reverse polarity as well. If, however, subsequently received packets do not have reversed polarity, then the method and device will 'reset' as follows. Given operation based on reversed polarity, the receiving device or circuitry, regardless of signal pair 52, 54, 56 should see a repetitive pattern of −1 +1 symbols (the opposite of the non-reversed expectation) until a +1 +1 pattern in the SOSB 64 or SSD. Correct polarity is detected if a −1 −1 is detected instead. In the currently preferred embodiment, if a −1 −1 a in the preamble (more particularly, in the SOSB 64 or SSD) of a packet is detected three packets in a row on a particular signal pair 52, 54, 56 operating in reverse polarity conditions, then that signal pair is deemed to have correct polarity. The three-packet requirement is the means for increasing the certainty of error detection, and is implemented to eliminate the false detection of reverse polarity due to signal noise or bad bits. The means for increasing the certainty of error detection, however, is not to be considered an essential element of the invention; those of ordinary skill in the art will realize that different requirements could also be used to reduce the probability of false detection. If a particular signal pair 52, 54, 56 is determined to have correct polarity, then the packet which comprises the third correct packet in a row and subsequently received packets will be passed unchanged to subsequent devices. The detection and correction cycle then begins again with the method and device operating in a correct polarity regime.

Figure 6A:
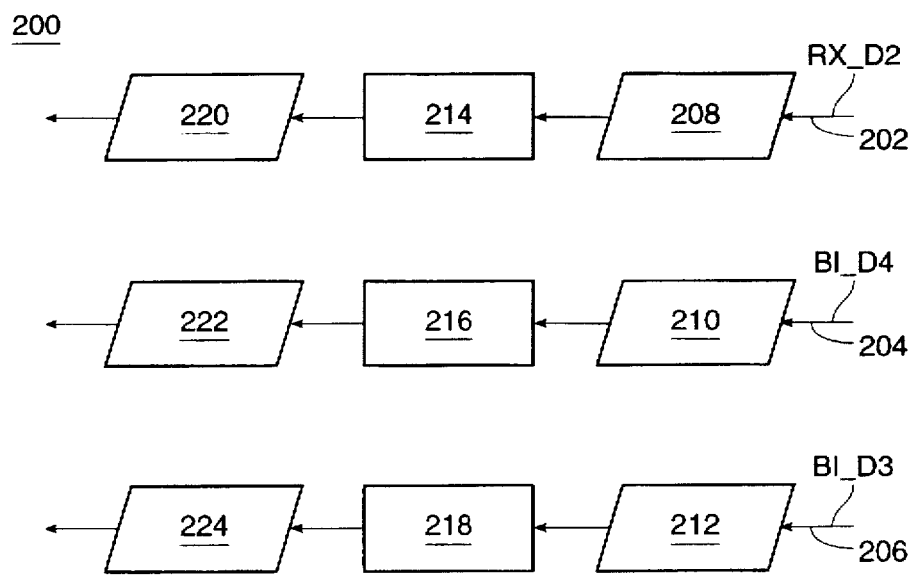
FIG. 6A is a diagram showing a preferred embodiment of an application of the present invention, used for detecting and correcting for reverse polarity in a 100BASE-T4 Ethernet system (T4).

FIG. 6A shows a preferred embodiment of an application of the present invention, used for detecting and correcting for reverse polarity in the 100BASE-T4 system (T4). The application of the present invention, used for detecting and correcting for reverse polarity in the 100BASE-T4 system 200 comprises input from the signal pairs RX_D2 202, BI_D4 204, and BI_D3 206. Each signal pair is received by a receiving function 208, 210, 212, operated upon by the method for detecting and correcting for reverse polarity 214, 216, 218, and passed to subsequent circuitry 220, 222, 224. As can be seen from FIG. 6A, reverse polarity is detected and corrected independently for each signal pair 202, 204, 206.

Figure 6B:
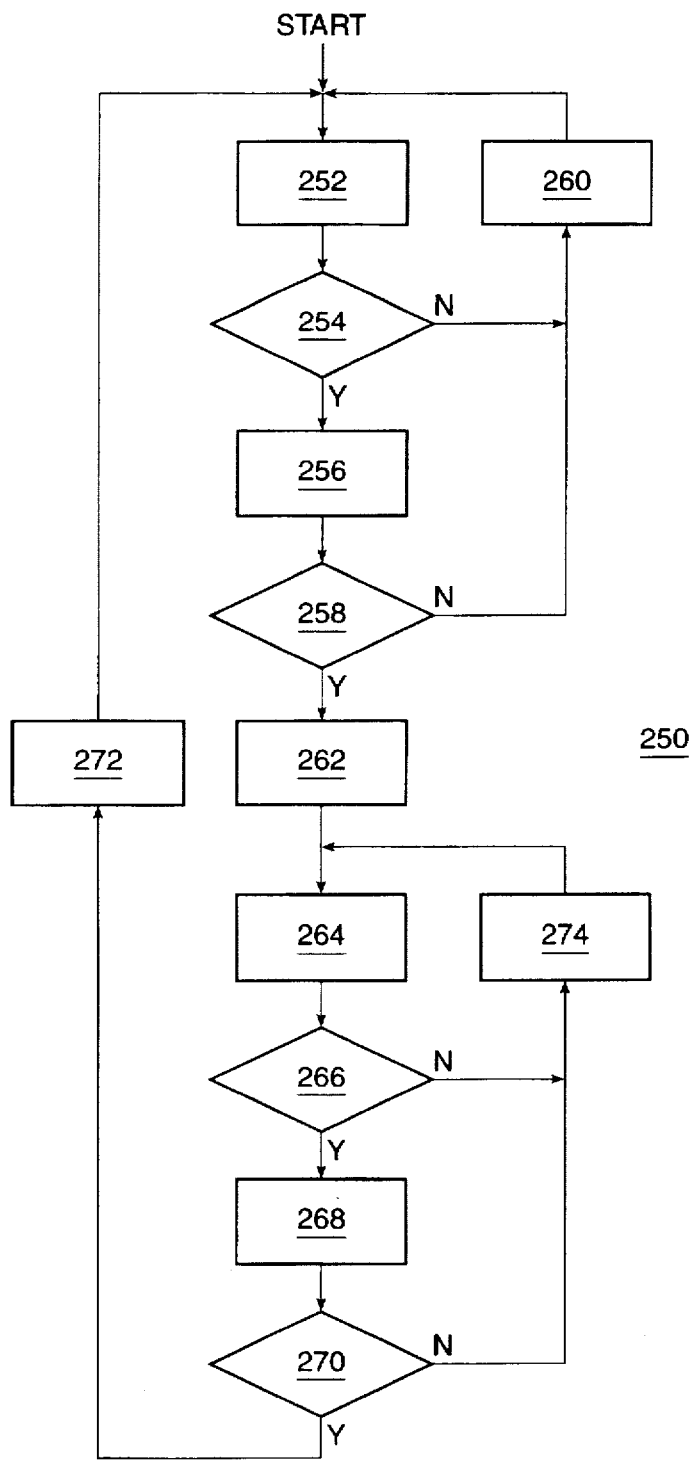
FIG. 6B is a diagram showing the method used for detecting and correcting for reverse polarity in a 100BASE-T4 Ethernet system, as shown in FIG. 6A.

FIG. 6B is a detailed depiction of the method used for detecting and correcting for reverse polarity 214, 216, 218 in FIG. 6A. Those of ordinary skill in the art will recognize that as each signal pair 202, 204, 206 operates independently in this embodiment of an application of the invention, the method depicted in FIG. 6B is equally applicable to any of the methods for detecting and correcting for reverse polarity 214, 216, 218 shown in FIG. 6A—a single method is shown for simplicity.

Turning to FIG. 6B, the method for detecting and correcting for reverse polarity in the 100BASE-T4 system 250 comprises: a first step of detecting the packet preamble pattern 252, a first step of determining whether a −1 −1 or a +1 +1 is present in the SOSB code group or SSD of a received packet 254, a step of incrementing a first counter 256, a first step of determining whether the first counter value is equal to or less than three 258, a first step of passing the received packet to subsequent circuitry unchanged 260, a first step of passing the received packet to subsequent circuitry in inverted form 262, a second step of detecting the packet preamble pattern 264, a second step of determining whether a −1 −1 or a +1 +1 is present in the SOSB code group or SSD of a received packet 266, a step of incrementing a second counter 268, a step of determining whether the second counter value is equal to or less than three 270, a second step of passing the received packet to subsequent circuitry unchanged 272, and a second step of passing the received packet in to subsequent circuitry inverted form 274.

The steps of passing the packet to subsequent circuitry unchanged 260, 272 are preferably accomplished by passing the received packet along to subsequent circuitry or devices unchanged, though another suitable mechanism (such as a transmitter or repeater mechanism) could also be used, as would be apparent to those of ordinary skill in the art. The steps of passing the packet to subsequent circuitry in inverted form 262, 274 are preferably accomplished by changing each received ternary symbol +1 into the ternary symbol −1, and then passing the inverted symbols to subsequent circuitry, though another suitable mechanism (such as a transmitter or repeater mechanism) could be used, as would be apparent to those of ordinary skill in the art. As the ternary symbol 0 (indicating zero voltage in the 100BASE-T4 system) is unaffected by reverse polarity, received 0 symbols are unaffected by inverting the packet symbols 262, 274. As will be apparent to those of ordinary skill in the art, separate devices or circuits could be used to accomplish the steps of passing the packet to subsequent circuitry unchanged 260, 272 and the steps of passing the packet to subsequent circuitry in inverted form 262, 274—and the packets could be routed appropriately. Alternatively, the same device or circuit could be used for both functions 260, 272, 262, 274, with the device or circuit having the ability to send inverted signals 262, 274.

In the preferred embodiment depicted in FIG. 6B, the steps of increasing the certainty of error detection 256, 258, 268, 270 are based on a principle of repeatability. That is, the method assumes that the repetition of packets with reverse polarity will increase the certainty that the detection of reverse polarity is correct. This will serve to compensate for occasional bad bits of data transmitted, and for signal noise which might otherwise cause incorrect detection of reverse polarity. Thus, the step of increasing the certainty of error detection is comprised of a step of incrementing a counter 256, 268, and a step of determining whether the counter value is equal or less than three 258, 270. As will be apparent to those of ordinary skill in the art, the limit of the counter value (in this case, three) is limited only by the desired certainty of the detection of reverse polarity.

Typical operation of the method for detecting and correcting for reverse polarity in the 100BASE-T4 system 250 will be as follows. As a packet is received, the preamble components are detected by the first step of detecting the packet preamble pattern 252. The first step of determining whether a −1 −1 or a +1 +1 is present in the SOSB code group or SSD of a received packet 254 will determine the subsequent steps. If a −1 −1 is present, indicating correct (non-reversed) polarity, then the subsequent step will be the first step of passing the received packet to subsequent circuitry unchanged 260, and the cycle will begin again with the next received packet. If, however, a +1 +1 is present, indicating reversed polarity, then the subsequent step will be the step of incrementing a first counter 256. After the first counter is incremented, the step of determining whether the first counter value is equal to or less than three 258 will determine the subsequent steps. If the first counter value is less than three, then the subsequent step will be the first step of passing the received packet to subsequent circuitry unchanged 260, and the first step of detecting the packet preamble pattern 252 will begin again with the next received packet. If, however, the first counter value is equal to three, then the subsequent step will be the first step of passing the received packet to subsequent circuitry in inverted form 262, and the first counter value will be reset to zero. After the received packet is passed in inverted form, then the next received packet will have the preamble components detected by the second step of detecting the packet preamble pattern 264. The second step of determining whether a −1 −1 or a +1 +1 is present in the SOSB code group or SSD of a received packet 266 will then determine the subsequent steps. If a +1 +1 is present, indicating reversed polarity, then the subsequent step will be the second step of passing the received packet to subsequent circuitry in inverted form 274, and the second step of detecting the packet preamble pattern 264 will begin again with the next received packet. If, however, a −1 −1 is present, indicating correct (non-reversed) polarity, then the subsequent step will be the step of incrementing a second counter 268. After the second counter is incremented, the step of determining whether the second counter value is equal to or less than three 270 will determine the subsequent steps. If the second counter value is less than three, then the subsequent step will be the second step of passing the received packet to subsequent circuitry in inverted form 274, and the second step of detecting the packet preamble pattern 264 will begin again with the next received packet. If, however, the second counter value is equal to three, then the subsequent step will be second step of passing the received packet to subsequent circuitry unchanged 272, the second counter value will be reset to zero, and the first step of detecting the packet preamble pattern 252 will begin again with the next received packet.

E. Detection and Correction of Reverse Polarity: Application for 100BASE-T4 Utilizing Link integrity signals and Non-Data Components of Received Packets An alternative embodiment of the present invention is also provided using the above-mentioned method for two of the three received signal pairs, BI_D4 16 and BI_D3 14, in a 100BASE-T4 system, and using a method for reverse polarity correction and detection on signal pair RX_D2 18 utilizing the link integrity signals defined for signal pair RX_D218.

Figure 7A:
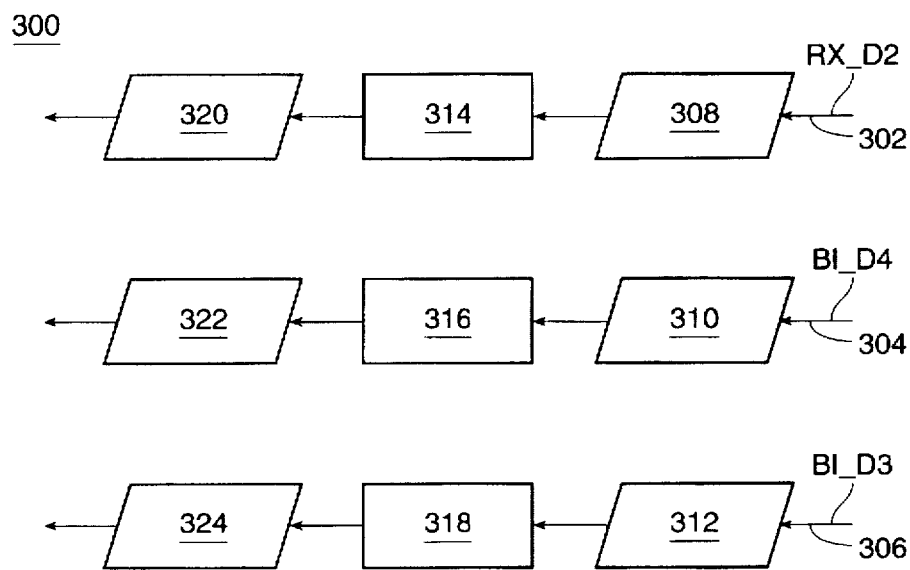
FIG. 7A is a diagram showing an alternative embodiment of an application of the present invention, utilizing link integrity signals in conjunction with packet preambles, configured to detect and correct for reverse polarity in a 100BASE-T4 Ethernet system.
Figure 7B:
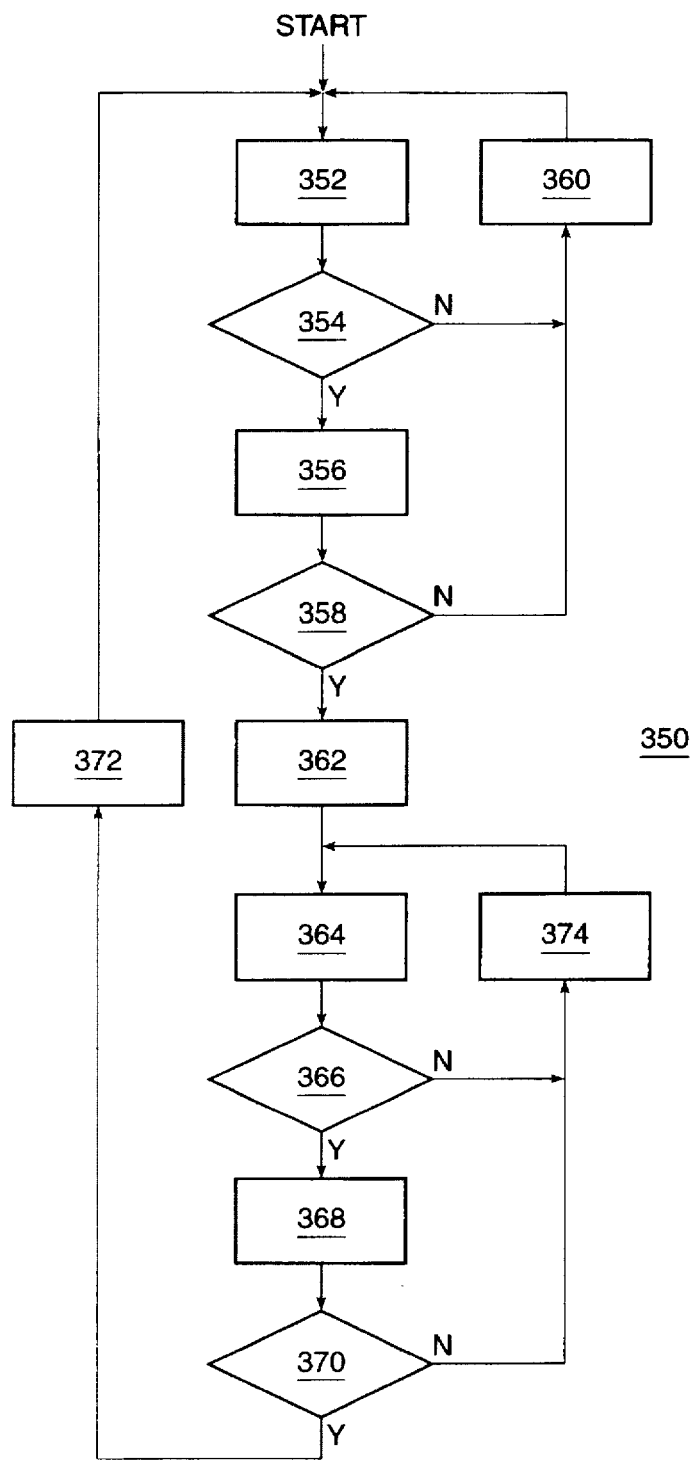
FIG. 7B is a diagram showing a method for detecting and correcting for reverse polarity in a 100BASE-T4 system utilizing link integrity signals, as shown in FIG. 7A.

FIG. 7A shows an alternative embodiment of an application of the present invention, configured to detect and correct for reverse polarity in a 100BASE-T4 system. The alternative embodiment of the application of the present invention, used for detecting and correcting for reverse polarity in the 100BASE-T4 system 300 comprises input from signal pairs RX_D2 302, BI_D4 304, and BI_D3 306. Each signal pair is received by a receiving function 308, 310, 312. Signal pairs BI_D4 304 and BI_D3 306 are operated upon by the method for detecting and correcting for reverse polarity 316, 318 as shown in FIG. 7B. Signal pair RX_D2 302 is operated upon by a method for detecting and correcting for reverse polarity utilizing link integrity signals 314, also shown in FIG. 7B. Each signal pair 302, 304, 306, is then passed to subsequent circuitry 320, 322, 324. As can be seen from FIG. 7A, reverse polarity is detected and corrected independently for each signal pair 302, 304, 306.

FIG. 7B depicts a method for detecting and correcting for reverse polarity utilizing link integrity signals and packet preambles as shown operating 314 upon signal pair RX_D2 302 in FIG. 7A. The method for detecting and correcting for reverse polarity utilizing link integrity signals 350 comprises: a first step of detecting the link integrity signal signals 352, a first step of determining whether the link integrity signal signals are −1 +1 or +1 −1 354, a step of incrementing a first counter 356, a step of determining whether the first counter value is equal to three 358, a first step of passing subsequently received data packets to further circuitry unchanged 360, a first step of passing subsequently received data packets to further circuitry in inverted form 362, a second step of detecting the link integrity signal signals 364, a second step of determining whether the link integrity signal signals are −1 +1 or +1 −1 366, a step of incrementing a second counter 368, a step of determining whether the second counter value is equal to three 370, a second step of passing subsequently received data packets to further circuitry unchanged 372, and a second step of passing subsequently received data packets to further circuitry in inverted form 374.

Typical operation of the method for detecting and correcting for reverse polarity utilizing link integrity signals 350 will be as follows. An incoming link integrity signal is detected 352. A first determination is made whether the link integrity signal is in −1 +1 form or +1 −1 form 354. If the link integrity signal is in −1 +1 form, indicating correct (non-reversed) polarity, then any subsequently received packets are passed unchanged 360, and the first detection of the link integrity signal 352 begins again with the next link integrity signal arrival. If, however, the link integrity signal is in +1 −1 form, indicating reversed polarity, then the first counter is incremented 356. A determination is then made whether the first counter value is equal to three 358. If the first counter value is not equal to three (less than three), then any subsequently received packets are passed unchanged 360, and the first detection of the link integrity signal 352 begins again with the next link integrity signal arrival. If, however, the first counter value is equal to three, then any subsequently received data is passed in inverted form 362, and the next arriving link integrity signal is detected by the second step of detecting a link integrity signal 364. A determination is again made regarding whether the link integrity signal is in −1 +1 form or +1 −1 form 366. If the link integrity signal is in +1 −1 form, indicating reverse polarity, then any subsequently received data packets are passed in inverted form 374, and the next arriving link integrity signal is detected by the second step of detecting a link integrity signal 364. If, however, the link integrity signal is in −1 +1 form, indicating correct (non-reversed) polarity, then the second counter is incremented 368. If the second counter value is not equal to three (less than three), then any subsequently received data packets are passed in inverted form 374, and the next arriving link integrity signal is detected by the second step of detecting a link integrity signal 364. If, however, the second counter value is equal to three, then any subsequently received packet are passed unchanged 372, and the first detection of the link integrity signal 352 begins again with the next link integrity signal arrival.

Figure 7C:
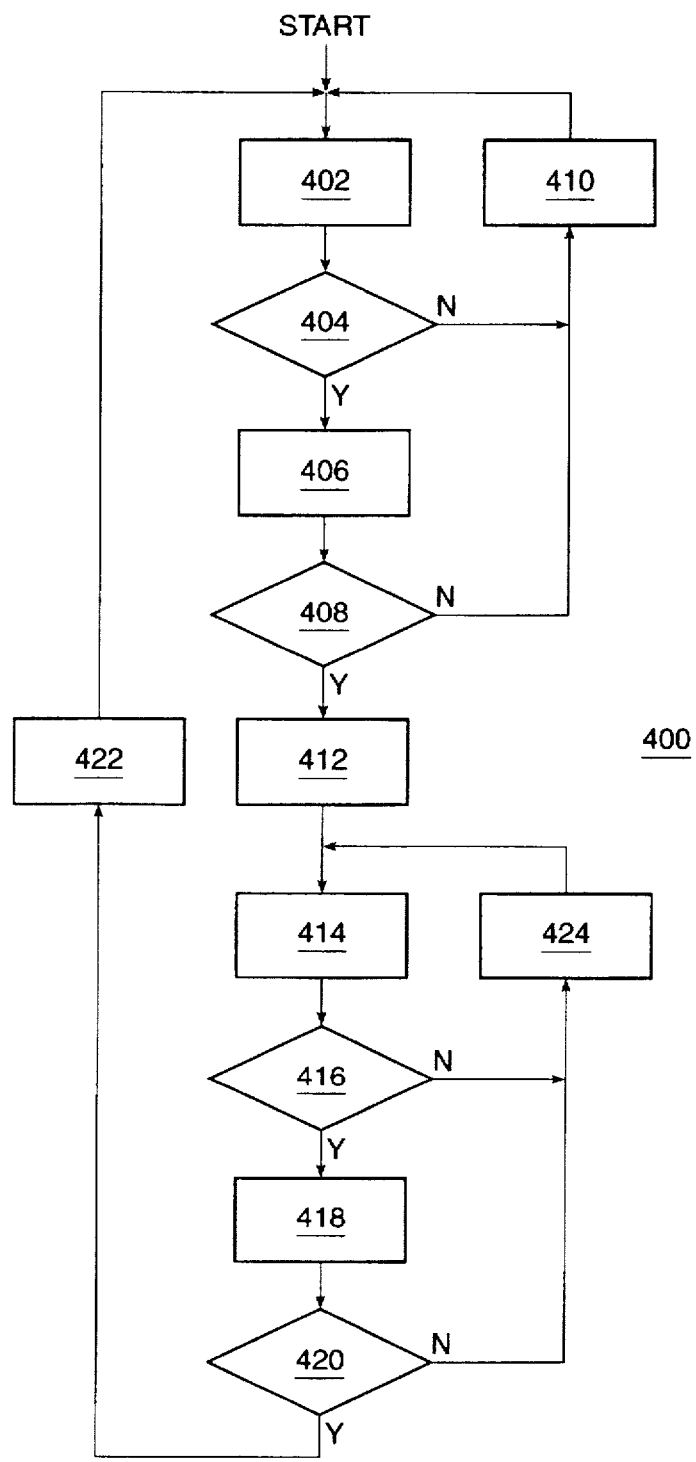
FIG. 7C is a diagram showing a method for detecting and correcting for reverse polarity in a 100BASE-T4 system utilizing packet preambles, as shown in FIG. 7A.

FIG. 7C depicts a method for detecting and correcting for reverse polarity in a 100BASE-T4 system as shown 316, 318 on signal pairs BI_D4 304 and BI_D3 306 in FIG. 7A. Though FIG. 7C shows a method for one channel, those or ordinary skill in the art will realize that the method described in FIG. 7C is applicable to both signal pairs BI_D4 304 and BI_D3 306.

Turning to FIG. 7C, the method for detecting and correcting for reverse polarity in the 100BASE-T4 system 400 comprises: a first step of detecting the packet preamble pattern 402, a first step of determining whether a −1 −1 or a +1 +1 is present in the SOSB code group or SSD of a received packet 404, a step of incrementing a first counter 406, a step of determining whether the first counter value is equal to or less than three 408, a first step of passing the received packet to subsequent circuitry unchanged 410, a first step of passing the received packet to subsequent circuitry in inverted form 412, a second step of detecting the packet preamble pattern 414, a second step of determining whether a −1 −1 or a +1 +1 is present in the SOSB code group or SSD of a received packet 416, a step of incrementing a second counter 418, a step of determining whether the second counter value is equal to or less than three 420, a second step of passing the received packet to subsequent circuitry unchanged 422, and a second step of passing the received packet in to subsequent circuitry inverted form 424.

Typical operation of the method for detecting and correcting for reverse polarity in the 100BASE-T4 system 400 will be as follows. As a packet is received, the preamble components are detected by the first step of detecting the packet preamble pattern 402. The first step of determining whether a −1 −1 or a +1 +1 is present in the SOSB code group or SSD of a received packet 404 will determine the subsequent steps. If a −1 −1 is present, indicating correct (non-reversed) polarity, then the subsequent step will be the first step of passing the received packet to subsequent circuitry unchanged 410, and the cycle will begin again with the next received packet. If, however, a +1 +1 is present, indicating reversed polarity, then the subsequent step will be the step of incrementing a first counter 406. After the first counter is incremented, the step of determining whether the first counter value is equal to or less than three 408 will determine the subsequent steps. If the first counter value is less than three, then the subsequent step will be the first step of passing the received packet to subsequent circuitry unchanged 410, and the first step of detecting the packet preamble pattern 402 will begin again with the next received packet. If, however, the first counter value is equal to three, then the subsequent step will be the first step of passing the received packet to subsequent circuitry in inverted form 412, and the first counter value will be reset to zero. After the received packet is passed in inverted form, then the next received packet will have the preamble components detected by the second step of detecting the packet preamble pattern 414. The second step of determining whether a −1 −1 or a +1 +1 is present in the SOSB code group or SSD of a received packet 416 will then determine the subsequent steps. If a +1 +1 is present, indicating reversed polarity, then the subsequent step will be the second step of passing the received packet to subsequent circuitry in inverted form 424, and the second step of detecting the packet preamble pattern 414 will begin again with the next received packet. If, however, a −1 −1 is present, indicating correct (non-reversed) polarity, then the subsequent step will be the step of incrementing a second counter 418. After the second counter is incremented, the step of determining whether the second counter value is equal to or less than three 420 will determine the subsequent steps. If the second counter value is less than three, then the subsequent step will be the second step of passing the received packet to subsequent circuitry in inverted form 424, and the second step of detecting the packet preamble pattern 414 will begin again with the next received packet. If, however, the counter value is equal to three, then the subsequent step will be the second step of passing the received packet to subsequent circuitry unchanged 422, the second counter value will be reset to zero, and the first step of detecting the packet preamble pattern 402 will begin again with the next received packet.

F. Detection and Correction of Reverse Polarity: Application for 100BASE-T4 Utilizing End-Of-Packet Delimiters (EOPs)

The present invention can also be applied to detect and correct for reverse polarity in a 100BASE-T4 system by using the end-of-packet delimiters (EOPs) in a similar fashion as the preamble components were used in the applications of the invention described above and in FIG. 6 and FIG. 7.

Figure 8A:
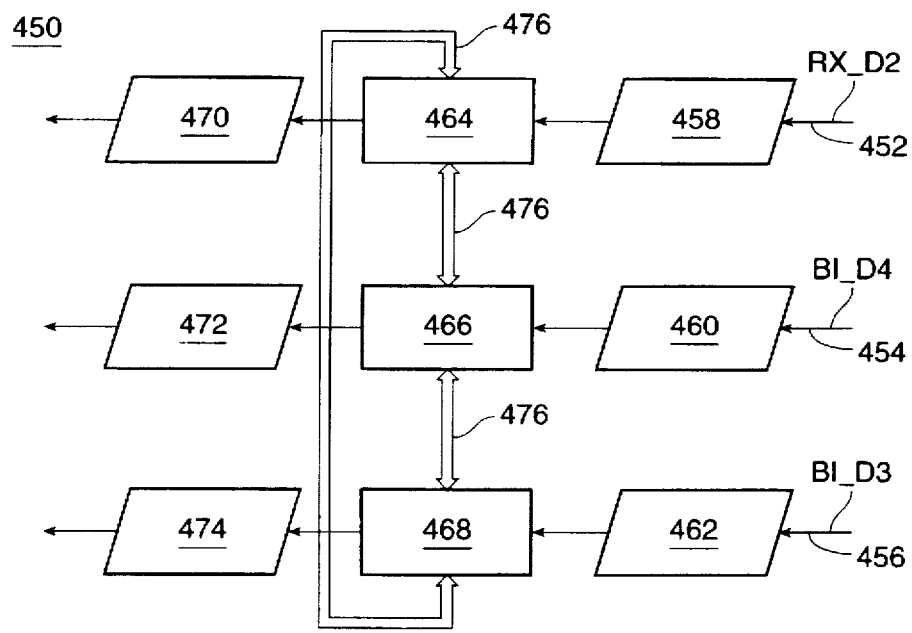
FIG. 8A is a diagram showing an alternative embodiment of an application of the present invention, configured to detect and correct for reverse polarity in a 100BASE-T4 system, using EOP packet components.

FIG. 8A shows an alternative embodiment of an application of the present invention, configured to detect and correct for reverse polarity in a 100BASE-T4 system, using EOP packet components. The alternative embodiment of an application of the present invention, configured to detect and correct for reverse polarity in a 100BASE-T4 system, using EOP packet components 450 comprises inputs from signal pair RX_D2 452, signal pair BI_D4 454, and signal pair BI_D3 456. Each signal pair is received by a receiving function 458, 460, 462. Each signal pair 452, 454, 456 is operated upon by a method for detecting and correcting for reverse polarity using EOPs 464, 466, 468. Each signal pair 452, 454, 456, is then passed to subsequent circuitry 470, 472, 474. Though each signal pair is independently operated upon by a method for detecting and correcting for reverse polarity using EOPs 464, 466, 468, these methods are interdependent, as indicated by the communications symbols 476. Thus, the detection and correction of reverse polarity for each signal pair 452, 454, 456 depends in part upon the detection and correction of reverse polarity for the other signal pairs 452, 454, 456.

Figure 8B:
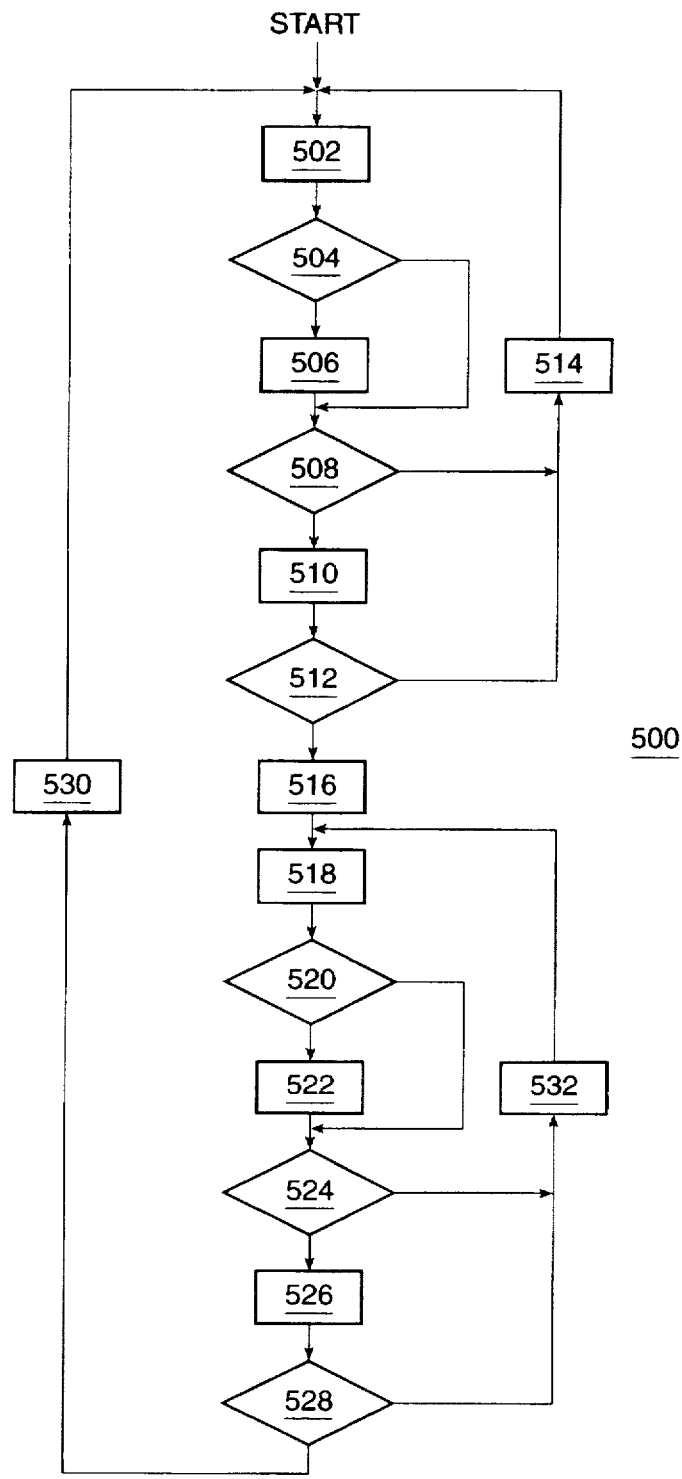
FIG. 8B is a diagram showing a method for detecting and correcting for reverse polarity using EOPs as shown in FIG. 8A.

FIG. 8B depicts a method for detecting and correcting for reverse polarity using EOPs as shown 464, 466, 468 in FIG. 8A. Though FIG. 8B shows a method for detecting and correcting for reverse polarity using EOPs for only one signal pair 452, 454, 456, the method described in FIG. 8B is applicable to all three signal pairs 452, 454, 456.

Turning to FIG. 8B, the method for detecting and correcting for reverse polarity using EOPs 500 comprises the following. As a packet is received, a first step of detecting the end-of-packet delimiters (EOPs) 502 is accomplished. A first determination is made regarding whether the EOP patterns are the EOP_1 and EOP_4 code groups 504. If the EOP patterns are the EOP_1 and EOP_4 code groups, then the next step is a first step of identifying the expected EOP patterns on the other signal pairs 506, and a first determination is made regarding the polarity of the signal pair 508, as the identity of the signal pair is known. If the EOP patterns are not the EOP_1 and EOP_4 code groups, the signal pair will be identified by a first step of identifying the expected EOP patterns on the other signal pairs 506 operating on another signal pair. Then a first determination is made regarding the polarity of the signal pair 508, using the identification of each signal pair performed by the first step of identifying the expected EOP patterns on the other signal pairs 506 operating on another signal pair. If the EOP patterns indicate that polarity is reversed, then a first counter is incremented 510. A determination is then made regarding the value of the first counter 512. If the first counter value is less than three, then the data packet is passed unchanged to subsequent circuitry 514, and the first detection of the end-of-packet delimiters (EOPs) 502 repeats when the next packet is received. If, however, the first counter value is equal to three, then the packet is passed in inverted form to subsequent circuitry 516, the first counter value is reset to zero, and a second step of detecting the EOPs 518 takes place when the next packet is received. After the second step of detecting the EOPs 518 takes place, a second determination is made regarding whether the EOP patterns are the EOP_1 and EOP_4 code groups 520. If the EOP patterns are the EOP_1 and EOP_4 code groups, then the next step is a second step of identifying the expected EOP patterns on the other signal pairs 522, and a second determination is made regarding the polarity of the signal pair 524, as the identity of the signal pair is known. If the EOP patterns are not the EOP_1 and EOP_4 code groups, the signal pair will be identified by a second step of identifying the expected EOP patterns on the other signal pairs 522 operating on another signal pair. Then a second determination is made regarding the polarity of the signal pair 524, using the identification of each signal pair performed by the first step of identifying the expected EOP patterns on the other signal pairs 522 operating on another signal pair. If the EOP patterns indicate that polarity is reversed, then a second counter is incremented 526. A determination is then made regarding the value of the second counter 528. If the second counter value is equal to three, then the data packet is passed unchanged to subsequent circuitry 530, the second counter value is reset to zero, and the first detection of the end-of-packet delimiters (EOPs) 502 repeats when the next packet is received. If, however, the counter value is less than three, then the packet is passed in inverted form to subsequent circuitry 532, and the second detection of the end-of-packet delimiters (EOPs) 518 repeats when the next packet is received.

The steps of determining whether the EOP patterns are the EOP_1 and EOP_4 code groups 504, 520 are accomplished by recognizing that the EOP_1 and EOP_4 code groups will: (1), always be appended to the packet on the same signal pair; and (2), uniquely consist of a series of twelve ternary symbols, one-half +1s, and one-half −1s. This pattern is unique among T4 non-data components, regardless of the polarity of the signal pair—while the correct polarity would call for EOP−1 (+1 +1 +1 +1 +1 +1) and then EOP_4 (−1 −1 −1 −1 −1 −1), the reversed polarity would, in effect, create a EOP_4 (−1 −1 −1 −1 −1 −1) and EOP_1 (+1 +1 +1 +1 +1 +1) pattern.

Figure 2A:
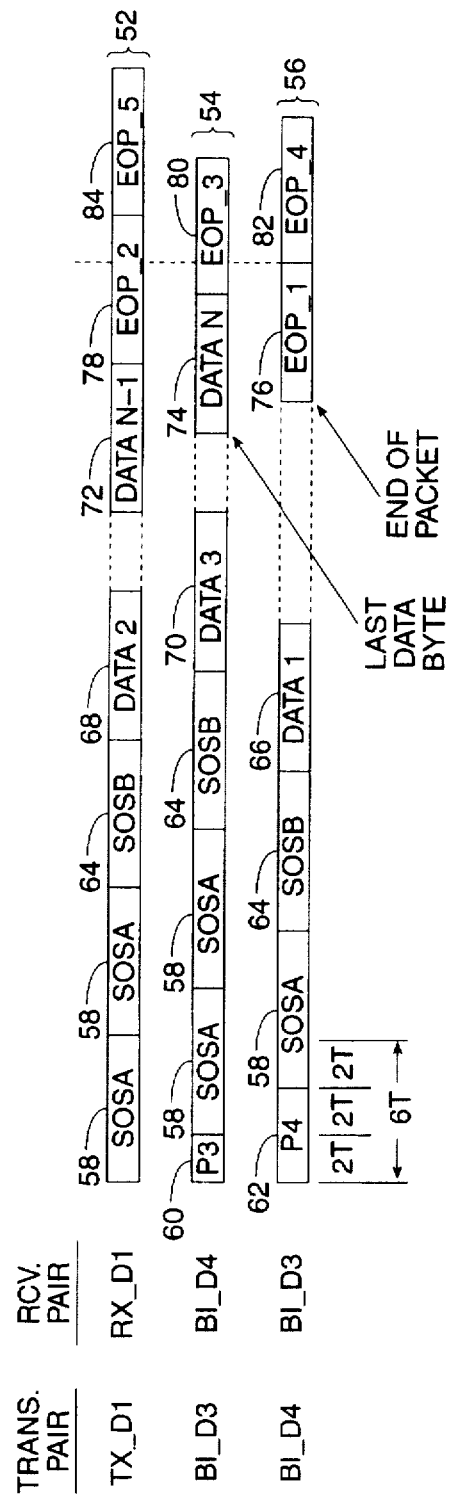
FIG. 2A is a diagram showing the composition and configuration of non-data and data components of packets according to the 100BASE-T4 Ethernet protocol.

The unique pattern of symbols created by the EOP_1 and EOP_4 code groups, regardless of polarity, also allow the accomplishment of the steps of identifying the expected EOP patterns on the other signal pairs 506, 522. As was noted above, the EOP code groups are impressed upon the three signal pairs in 100BASE-T4 in a specific cyclical pattern. Thus, once the signal pair with the EOP_1/EOP_4 pattern is identified 504, 520, then the expected EOP patterns on the other two pairs may be determined 506, 522. FIG. 2A shows the ordering scheme. The scheme calls for the EOP_2 78 and EOP_5 84 code groups to be placed on the signal pair immediately after the signal pair containing the EOP_1 76/EOP_5 82 pattern in the cyclical order. Then, then the EOP_3 80 code group will be placed on the signal pair immediately prior to the signal pair containing the EOP_1 76/EOP_4 82 pattern in the cyclical order. Thus, in the example shown in FIG. 2A, received signal pair BI_D3 56 contains the EOP_1 76/EOP_4 82 pattern, so the received signal pair RX_D2 52 will contain the EOP_2 78/EOP_5 84 pattern, and the received step of determining whether the second signal pair BI_D4 54 will contain EOP_3 80. By identifying the signal pair containing the EOP_1 76/EOP_4 82 pattern, the steps of identifying the expected EOP patterns on the other signal pairs 506, 522 can be accomplished.

The steps of determining the polarity of the signal pair 508, 524 are accomplished by comparing the expected EOP pattern on the signal pair with that which is received. The expected EOP pattern is either known from the steps of determining whether the EOP_1 and EOP_4 code groups are present 504, 520, or known from information provided by the step of identifying the expected EOP patterns on the other signal pairs 506, 522 from another signal pair. Thus, if the EOP_1/EOP_4 pattern is expected, then the ternary symbol pattern expected is +1 +1 +1 +1 +1 +1 −1 −1 −1 −1 −1 −1; if a −1 −1 −1 −1 −1 −1 +1 +1 +1 +1 +1 +1 pattern is detected, then polarity is determined to be reversed. Similarly, if the EOP_2/EOP_5 pattern is expected, then the ternary symbol pattern expected is +1 +1 +1 +1 −1 −1 −1 −1 0 0 0 0; if a −1 −1 −1 −1 +1 +1 +1 +1 0 0 0 0 pattern is detected, then polarity is determined to be reversed. Similarly, if the EOP_3 pattern is expected, then the ternary symbol pattern expected is +1 +1 −1 −1 0 0; if a −1 −1 +1 +1 0 0 pattern is detected, then the polarity is determined to be reversed.

The steps of passing the packet to subsequent circuitry unchanged 514, 530 are preferably accomplished by passing the received packet along to subsequent circuitry or devices unchanged, though another suitable mechanism (such as a transmitter or repeater mechanism) could also be used, as would be apparent to those of ordinary skill in the art. The steps of passing the packet to subsequent circuitry in inverted form 516, 532 are accomplished by changing each received ternary symbol +1 into the ternary symbol −1, and then passing the inverted symbols to subsequent circuitry, though another suitable mechanism (such as a transmitter or repeater mechanism) could be used, as would be apparent to those of ordinary skill in the art. As the ternary symbol 0 (indicating zero voltage in the 100BASE-T4 system) is unaffected by reverse polarity, received 0 symbols are unaffected by inverting the packet symbols 516, 532.

The method for detecting and correcting for reverse polarity using EOPs 500 shown in FIG. 8B preferably includes means for increasing the certainty of error detection. This means is based on the principle of repeatability. That is, the method assumes that the repetition of packets with reverse polarity will increase the certainty that the detection and correction of reverse polarity is correct. This will serve to compensate for occasional bad bits of data transmitted, and for signal noise which might otherwise cause incorrect detection of reverse polarity. Thus, the means for increasing the certainty of error detection is comprised of the steps of incrementing a counter 510, 526, and the steps of determining whether the counter value is equal to three 512, 528. As will be apparent to those of ordinary skill in the art, the limit of the counter value (three) is determined only by the desired certainty of the detection of reversed polarity, and is not a limitation of the method or device. Indeed, the inclusion of a means for increasing the certainty of error detection, comprising steps of incrementing a counter 510, 526 and steps of determining whether the counter value is equal to three 512, 528, is not itself a limitation of the method or device, as will be apparent to those of ordinary skill in the art.

II. DETECTION AND CORRECTION OF PAIR SWAP

The present invention can also provide a method for the detection and correction of pair swap using a combination of link integrity signals and non-data components of packets. The invention can provide detection and correction of pair swap for three multiple channels or signal pairs, as long as one signal pair or channel contains a link integrity signal.

Figure 9A:
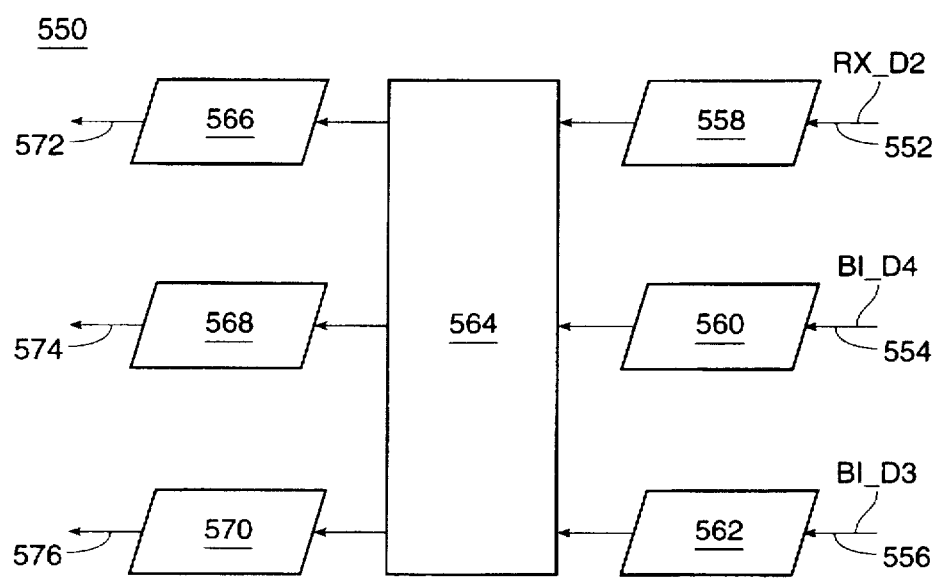
FIG. 9A is a diagram showing an embodiment of the present invention, configured to detect and correct for pair swap (also known as channel swap) for a system utilizing three received signal pairs, such as 100BASE-T4(T4).

A. Detection and Correction of Pair Swap: Embodiment Utilizing Packet Preambles and Link Integrity Signals FIG. 9A shows an embodiment of the present invention, configured to detect and correct for pair swap (also known as channel swap) for a system utilizing three received signal pairs, such as 100BASE-T4(T4). It will be apparent to those of ordinary skill in the art that many other configurations of the present invention could be used to provide detection and correction of pair swap; therefore, FIG. 9A, while fully capable and descriptive, is but one of many possible configurations of the present invention. Additionally, while the following description is generally directed at a 100BASE-T4 system, those of ordinary skill in the art will recognize that this aspect of the invention, as with other aspects of the invention, is fully applicable to other packet-based data communications systems, particularly data communications systems which improve on or develop from the 100BASE-T4 technology.

Turning to FIG. 9A, the apparatus for detection and correction of pair swap 550 accepts inputs from three channels or signal pairs 552, 554, 556. The channels are received by a receiving device or circuit 558, 560, 562, operated upon by a device or apparatus implementing a method for detecting and correcting for pair swap 564, and passed by a device or circuit used for passing received data 566, 568, 570. The invention allows potentially 'swapped' channels 552, 554, 556 to be received 558, 560, 562, corrected if necessary 564, and then passed 566, 568, 570 to subsequent devices, circuitry, or algorithms without pair swap 572, 574, 576. The output of the embodiment shown in FIG. 9A 550 is a set of channels 572, 574, 576 that can be used by subsequent devices with assured identity of the channels of signal pairs.

Figure 9B:
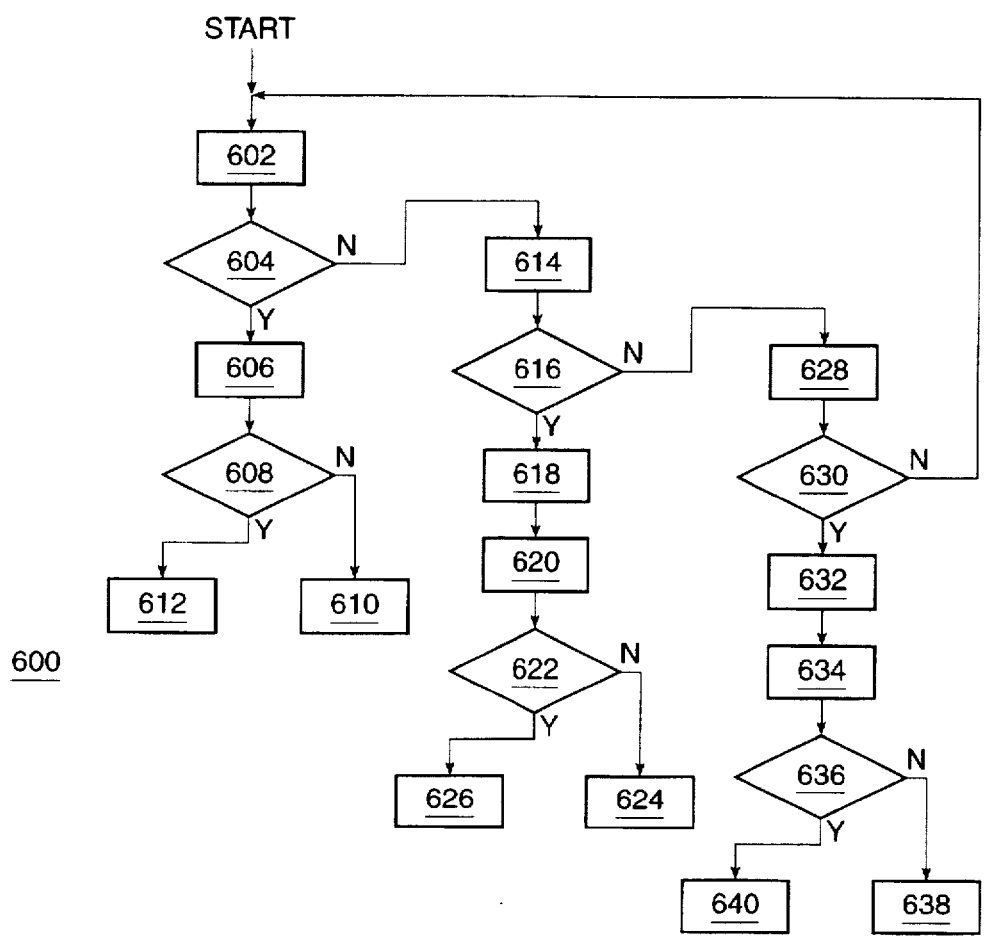
FIG. 9B is a diagram showing a method, according to the present invention, for detecting and correcting for pair swap as shown in FIG. 9A.

FIG. 9B depicts a method, according to the present invention, for detecting and correcting for pair swap. The operation of an apparatus implementing the method in FIG. 9B is shown 564 in FIG. 9A.

Turning to FIG. 9B, the method for detecting and correcting for pair swap 600 operates as follows. The presence of a link integrity signal is ascertained 602 on a selected received channel or signal pair. In the embodiment of the invention shown in FIGS. 9A and 9B, RX_2 552 is expected to include a link integrity signal; therefore RX_D2 552 is preferably the initial channel upon which the step of ascertaining a link integrity signal 602 is operated, though another received channel 554, 556 could be also be selected, as will be apparent to those of ordinary skill in the art. If a link integrity signal is present 604, then the selected channel (RX_D2 552 in this case) is deemed not to be swapped, and the preamble patterns are detected on the other two channels 606, BI_D4 554 and BI_D3 556, upon arrival of the next packet. By comparing the received preamble symbol patterns with the expected patterns and comparing the received preamble symbol patterns on the remaining two signal pairs 606, a determination can be made regarding whether the two remaining channels are swapped 608. If the remaining channels, BI_D4 554 and BI_D3 556, are swapped, then the received signals will be switched 610 before being passed to subsequent circuitry, and subsequently received signals will be similarly switched—achieving the correct identification of the channels. If the remaining channels are not swapped, then the received signals will be passed to subsequent circuitry unchanged 612, and subsequently received signals will be similarly unchanged.

If, however, the determination is made 604 that a link integrity signal on the selected channel is not present, then a second channel is sensed to ascertain the presence of a link integrity signal 614. In the embodiment shown in FIG. 9A and FIG. 9B, this second channel will be BI_D4 554. Those of ordinary skill in the art, however, will recognize that either of the two remaining channels, BI_D4 554 or BI_D3 556, could be selected. If, in the second step of sensing a link integrity signal 614, a link integrity signal is determined to be present, then the selected channel (BI_D4 554 in this case) is identified as the channel expected to contain a link integrity signal 616 (RX_D2 552 in this case), and the received signals are switched accordingly 618. The signals received on the initially selected channel (RX_2 552 in this case) are also switched—to the second selected channel (BI_D4 554 in this case). Next, the preamble patterns are detected and compared 620 on channels BI_D4 554 and BI_D3 556 upon arrival of the next packet. By comparing the received preamble symbol patterns with the expected patterns and comparing the received preamble symbol patterns on BI_D4 554 and BI_D3 556 signal pairs 620, a determination can be made regarding whether BI_D4 554 and BI_D3 556 are swapped 622. If the remaining channels, BI_D4 554 and BI_D3 556, are swapped, then the received signals will be switched 624 before being passed to subsequent circuitry, and subsequently received signals will be similarly switched—achieving the correct identification of the channels. If the remaining channels are not swapped, then the received signals will be passed to subsequent circuitry unchanged 626, and subsequently received signals will be similarly unchanged.

If, however, the second determination is made 616 that a link integrity signal on the second selected channel (BI__D4 554 in this case) is not present, then a third channel is sensed to ascertain the presence of a link integrity signal 628. In the preferred embodiment shown in FIG. 9A and FIG. 9B, this third channel will be BI__D3 556, though the identity of the third channel will be dependent upon the ordering of the earlier channel selection, as will be apparent to those of ordinary skill in the art. If, in the third step of sensing a link integrity signal 628, a link integrity signal is determined to be present, then the selected channel (BI__D3 556 in this case) is identified as the channel expected to contain a link integrity signal (RX__D2 552 in this case), and the received signals are switched accordingly 632. The signals received on the channel expected to contain a link integrity signal (RX__2 552 in this case) are also switched—to the third selected channel (BI__D3 556 in this case). Next, the preamble patterns are detected 634 on the other two channels, BI__D4 554 and BI__D3 556, upon arrival of the next packet. By comparing the received preamble symbol patterns with the expected patterns and comparing the received preamble symbol patterns on the remaining two, BI__D4 554 and BI__D3 556, signal pairs 634, a determination can be made regarding whether the two remaining channels, BI__D4 554 and BI__D3 556, are swapped 636. If the remaining channels, BI__D4 554 and BI__D3 556, are swapped, then the received signals will be switched 638 before being passed to subsequent circuitry, and subsequently received signals will be similarly switched achieving the correct identification of the channels. If the remaining channels are not swapped, then the received signals will be passed to subsequent circuitry unchanged 640, and subsequently received signals will be similarly unchanged.

If, however, the third determination is made 630 that a link integrity signal on the selected channel (BI__D3 in this case) is not present, indicating no link integrity signals present on any of the channels, then the method will "restart"—again attempting to detect link integrity signals 602.

As an example for illustration only, a potential situation can be envisioned wherein: RX__D2 552 and BI__D3 556 are 'swapped'. That is, the signals expected to be carried on RX__D2 552 are instead carried on BI__D3 556, and the signals expected on BI__D3 556 are on RX__D2 552. The preferred operation of this aspect of the invention will be the following steps: the initial detection 602 of link integrity signals on RX D2 552 will fail 604, so BI__D4 554 will preferably be sensed for link integrity signals 614. This step will also fail 616, so the third channel, BI__D3 556 will be sensed for link integrity signals 628. As the signals expected on RX__D2 552 are actually on BI__D3 556 and RX__D2 552 is defined with a link integrity signal, the detection of link integrity signals 628 on BI__D3 556 will succeed 630. Thus, the signals received on BI__D3 556 will be switched 632 with the signals received on RX__D2 552. Then, the remaining channels, BI__D4 554 and BI__D3 556 (now containing signals originally received on RX__D2 552) will have their preambles detected and compared 634. As BI__D4 554 is not swapped, and the signals originally received on RX__D2 552 are now on the correct channel (BI__D3 556), the comparison will indicate no pair swapping, and the subsequently received signals will be passed unchanged 640.

As will be apparent to those of ordinary skill in the art, the preceding description of a possible operation of the method is but one of many potential pair swapping situations that may be encountered and corrected by the device.

The steps of detecting and comparing the packet preambles 606, 620, 634 (on BI__D4 554 and BI__D3 556 in the above description) are accomplished by comparing the received packet preambles on each channel or signal pair, BI__D4 554 and BI__D3 556. Turning again to FIGS. 2A and 2B, the expected pattern of code groups and data symbols received on BI D4 54, 554 will be: <P3><SOSA><SOSA><SOSB>, or +1 −1 +1 −1 +1 −1 +1 −1 +1 −1 +1 −1 +1 −1 +1 −1 +1 −1 +1 −1 +1. The expected pattern of code groups and data symbols received on BI__D3 56, 556 will be: <P4><SOSA><SOSB>, or +1 −1 +1 −1 +1 −1 +1 −1 +1 −1+BI__D4 54, 554 and BI__D3 56, 556 will arrive approximately simultaneously (within allowable misalignment limits), the −1 −1 pattern in the preamble (more specifically the −1 −1 pattern in the SOSB 64 or SSD) on signal pair BI__D4 54, 554 will occur four (4) symbol times (plus or minus the maximum allowable misalignment limits) after the −1 −1 pattern in the preamble (more specifically the −1 −1 pattern in the SOSB 64 or SSD)on signal pair BI__D3 56, 556. In the T4 system, a symbol time is 40 ns; the maximum allowable misalignment is 60 ns. Therefore, in the T4 example, the expected delay between the −1 −1 pattern in the preamble (more specifically the −1 −1 pattern in the SOSB 64 or SSD) on signal pair BI__D4 54, 554 and the −1 −1 pattern in the preamble (more specifically the −1 −1 pattern in the SOSB 64 or SSD)on signal pair BI__D3 56 556 will be: 160 ns±60 ns, or the range from 100 ns to 220 ns Thus, if the −1 −1 pattern in the preamble (more specifically the −1 −1 pattern in the SOSB 64 or SSD) on signal pair BI__D4 54, 554 occurs less than four symbol times plus or minus the maximum allowable misalignment (or less than 100 ns) after the −1 −1 pattern on signal pair BI__D3 56, 556, then signal pairs BI__D4 54, 554 and BI__D3 56, 556 are deemed to be swapped. Similarly, if the −1 −1 pattern in the preamble (more specifically the −1 −1 pattern in the SOSB 64 or SSD) on signal pair BI__D4 54, 554 occurs more than four symbol times plus or minus the maximum allowable misalignment (or more than 220ns) after the −1 −1 pattern on signal pair BI__D3 56, 556, then signal pairs BI__D4 54, 554 and BI__D3 56, 556 are deemed to be swapped.

As will be apparent to those of ordinary skill in the art, the steps of detecting and comparing the packet preambles 606, 620, 634 could be implemented in a similar fashion for other protocols and data communications systems; the above description is intended to be illustrative rather than limiting.

Figure 9C:
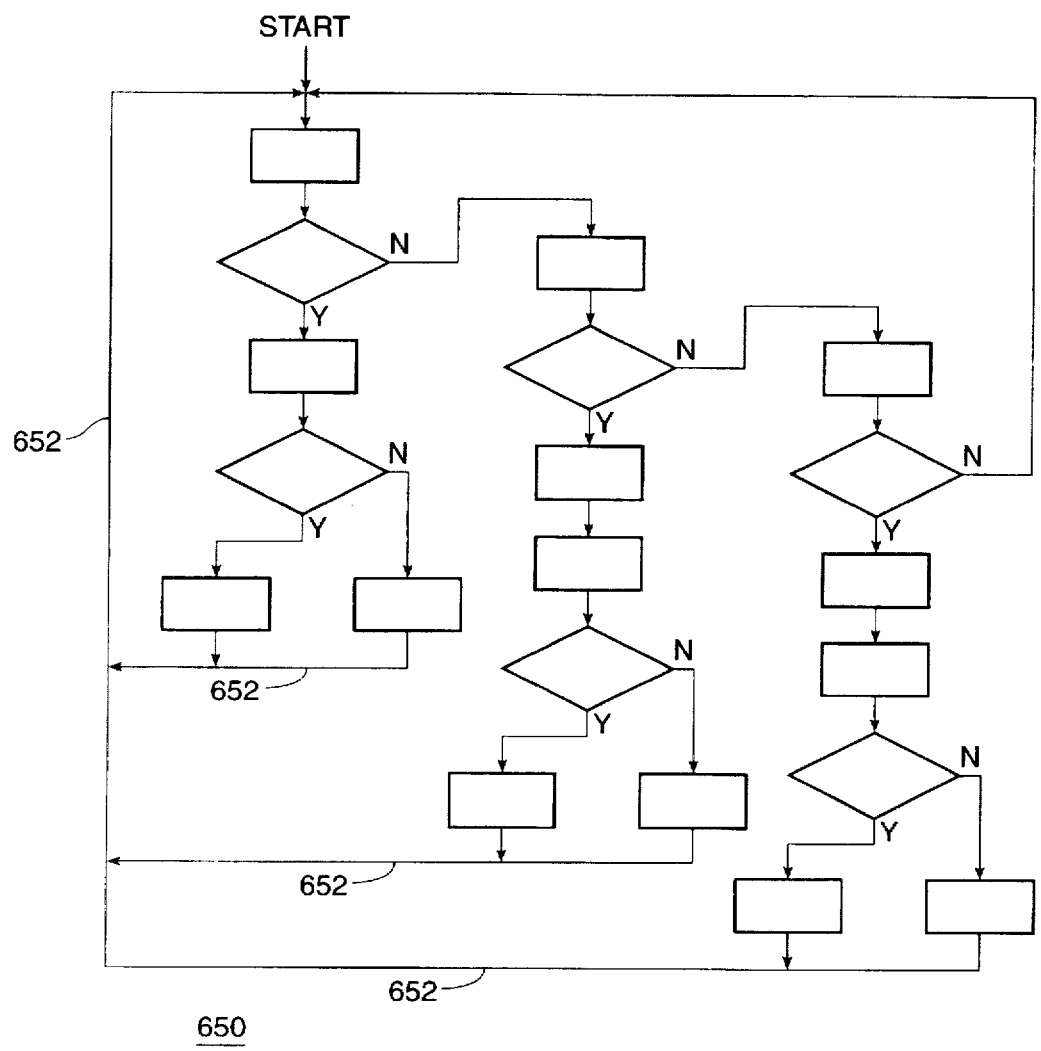
FIG. 9C is a diagram showing a method for detecting and correcting for pair swap as shown in FIG. 9B with the addition of a cyclical function to allow for continuous detection and correction of pair swap.

Typical implementation of the preferred embodiment of this aspect of the invention 600 will be as part of a device used to set the mode of operation of a multiple channel receiving device rather than as a continuous method. That is, the apparatus and methods depicted in FIG. 9A and FIG. 9B will be operated when activated, perhaps at the initial 'power-up' of the receiving device, or at the connection of wiring or other transmission media, and will otherwise be a passive element in the receiving circuitry. It will be apparent, however, that the embodiments of the invention described in FIG. 9A and FIG. 9B above would be effective in continuous operation as well. FIG. 9C depicts the method for detecting and correcting for pair swap 650 as shown 600 in FIG. 9B with the addition of a cyclical function 652 to allow for continuous detection and correction of pair swap. The operation of the method will otherwise be as described in FIG. 9B.

B. Detection and Correction of Pair Swap: Alternative Embodiment Utilizing EOPs and Link integrity signals An alternative to the aspect of the present invention shown in FIG. 9A and FIG. 9B utilizes the end-of-packet delimiters (EOPs) (instead of using the packet preambles as described above) in conjunction with link integrity signals to achieve detection and correction of pair swap.

Figure 10A:
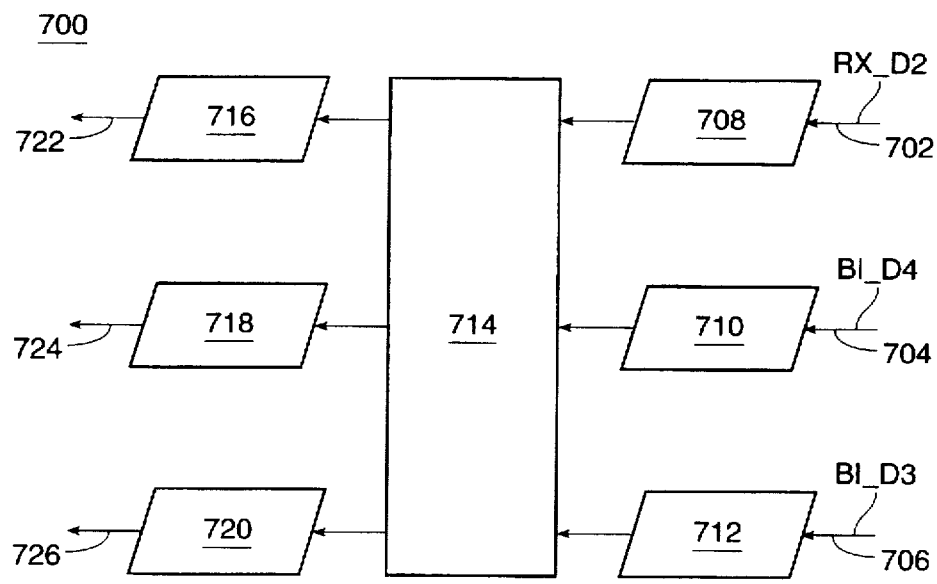
FIG. 10A is a diagram showing an alternative embodiment the present invention, configured to detect and correct for pair swap (also known as channel swap) utilizing EOPs.

FIG. 10A shows an alternative embodiment of the second aspect of the present invention, configured to detect and correct for pair swap (also known as channel swap) for a system utilizing three received signal pairs, such as 100BASE-T4(T4). It will be apparent to those of ordinary skill in the art that other many other configurations of the present invention could be used to provide detection and correction of pair swap; therefore, FIG. 10A, while fully capable and descriptive, is but one of many possible configurations of the present invention. Additionally, while the following description is generally directed at a 100BASE-T4 system, those of ordinary skill in the art will recognize that this aspect of the invention, as with other aspects of the invention, is fully applicable to other packet-based data communications systems, particularly data communications systems which improve on or develop from the 100BASE-T4 technology.

Turning to FIG. 10A, the apparatus for detection and correction of pair swap 700 accepts inputs from three channels or signal pairs 702, 704, 706. The channels are received by a receiving device 708, 710, 712, operated upon by a device or apparatus implementing a method for detecting and correcting for pair swap using EOPs 714, and passed by a repeating device 716, 718, 720. The invention allows potentially 'swapped' channels 702, 704, 706 to be received 708, 710, 712, corrected if necessary 714, and then passed 716, 718, 720 to subsequent devices, circuitry, or algorithms without pair swap 722, 724, 726. The output of the embodiment shown in FIG. 10A 700 is a set of channels 722, 724, 726 that can be used by subsequent devices with assured identity of the channels of signal pairs.

Figure 10B:
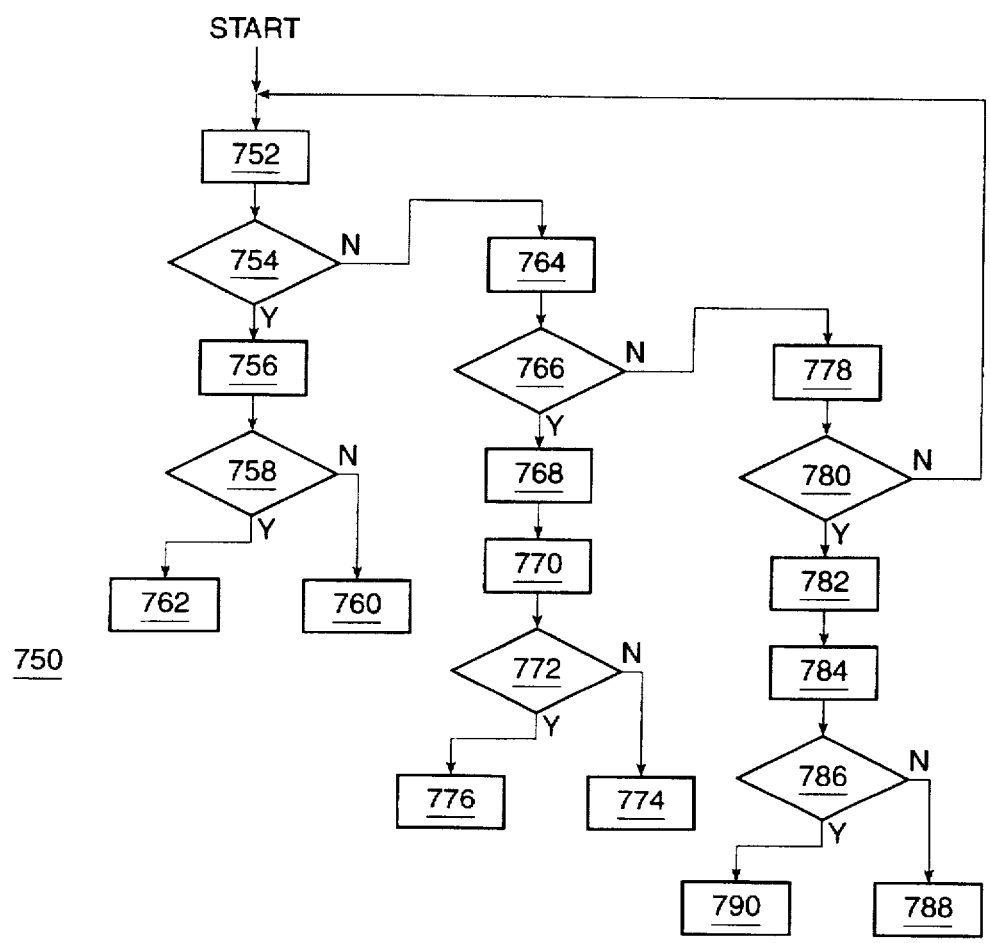
FIG. 10B is a diagram showing a method, according to the present invention, for detecting and correcting for pair swap utilizing EOPs as shown in FIG. 10A.

FIG. 10B depicts an alternative method, according to the present invention, for detecting and correcting for pair swap using EOPs. The operation of an apparatus implementing the method in FIG. 10B is shown 714 in FIG. 10A.

Turning to FIG. 10B, the method for detecting and correcting for pair swap 750 operates as follows. The presence of a link integrity signal is ascertained 752 on a selected received channel or signal pair. In the embodiment of the invention shown in FIGS. 10A and 10B, RX D2 702 is expected to include a link integrity signal; therefore RX_D2 702 is preferably the initial channel upon which the step of ascertaining a link integrity signal 752 is operated, though another received channel 704, 706 could be also be selected, as will be apparent to those of ordinary skill in the art. If a link integrity signal is present 754, then the selected channel (RX_D2 702 in this case) is deemed not to be swapped, and the end-of-packet delimiter (EOP) patterns on each signal pair 702, 704, 706 are detected 756 upon arrival of the next packet. By comparing the ordering of the received EOP symbol patterns with the expected ordering, a determination can be made regarding whether the two remaining channels are swapped 758. If the remaining channels, BI_D4 704 and BI_D3 706, are swapped, then the received signals will be switched 760 before being passed to subsequent circuitry, and subsequently received signals will be similarly switched—achieving the correct identification of the channels. If the remaining channels are not swapped, then the received signals will be passed to subsequent circuitry unchanged 762, and subsequently received signals will be similarly unchanged.

If, however, the determination is made 754 that a link integrity signal on the selected channel is not present, then a second channel is sensed to ascertain the presence of a link integrity signal 764. In the embodiment shown in FIG. 10A and FIG. 10B, this second channel will be BI_D4 704. Those of ordinary skill in the art, however, will recognize that either of the two remaining channels, BI_D4 706 or BI_D3 1503, could be selected. If, in the second step of sensing a link integrity signal 764, a link integrity signal is determined to be present, then the selected channel (BI_D4 704 in this case) is identified as the channel expected to contain a link integrity signal (RX_D2 702 in this case), and the received signals are switched accordingly 768. The signals received on the initially selected channel (RX D2 702 in this case) are also switched—to the second selected channel (BI_D4 704 in this case). Next, the EOP patterns are detected and compared 770 upon arrival of the next packet. By comparing the ordering of the received EOP symbol patterns with the expected ordering patterns, a determination can be made regarding whether BI_D4 704 and BI_D3 706 are swapped 772. If the remaining channels, BI_D4 704 and BI_D3 706, are swapped, then the received signals will be switched 774 before being passed to subsequent circuitry, and subsequently received signals will be similarly switched—achieving the correct identification of the channels. If the remaining channels are not swapped, then the received signals will be passed to subsequent circuitry unchanged 776, and subsequently received signals will be similarly unchanged.

If, however, the second determination is made 766 that a link integrity signal on the second selected channel (BI_D4 704 in this case) is not present, then a third channel is sensed to ascertain the presence of a link integrity signal 764. In the preferred embodiment shown in FIG. 10A and FIG. 10B, this third channel will be BI_D3 706, though the identity of the third channel will be dependent upon the ordering of the earlier channel selection, as will be apparent to those of ordinary skill in the art. If, in the third step of sensing a link integrity signal 778, a link integrity signal is determined to be present, then the selected channel (BI_D3 706 in this case) is identified as the channel expected to contain a link integrity signal (RX_D2 702 in this case), and the received signals are switched accordingly 782. The signals received on the channel expected to contain a link integrity signal (RX_D2 702 in this case) are also switched—to the third selected channel (BI_D3 706 in this case). Next, the EOP patterns are detected 784 upon arrival of the next packet. By comparing the ordering of the received EOP symbol patterns with the expected ordering, a determination can be made regarding whether the two remaining channels, BI_D4 704 and BI D3 706, are swapped 786. If the remaining channels, BI_D4 704 and BI_D3 706, are swapped, then the received signals will be switched 788 before being passed to subsequent circuitry, and subsequently is received signals will be similarly switched—achieving the correct identification of the channels. If the remaining channels are not swapped, then the received signals will be passed to subsequent circuitry unchanged 790, and subsequently received signals will be similarly switched.

If, however, the third determination is made 778 that a link integrity signal on the selected channel (BI_D3 in this case) is not present, indicating no link integrity signals present on any of the channels, then the method will "restarts"—again attempting to detect link integrity signals 752.

As an example for illustration only, a potential situation can be envisioned wherein: RX_D2 702 and BI_D3 706 are 'swapped'. That is, the signals expected to be carried on RX_D2 702 are instead carried on BI_D3 706, and the signals expected on BI_D3 706 are on RX_D2 702. The preferred operation of this aspect of the invention will be the following steps: the initial detection 752 of link integrity signals on RX_D2 702 will fail 754, so BI_D4 704 will preferably be sensed for link integrity signals 764. This step will also fail 766, so the third channel, BI_D3 706 will be sensed for link integrity signals 778. As the signals expected on RX_D2 702 are actually on BI_D3 706 and RX_D2 702 is defined with a link integrity signal, the detection of link integrity signals 778 on BI_D3 706 will succeed 780. Thus, the signals received on BI_D3 706 will be switched 782 with the signals received on RX_D2 702. Then, the remaining channels, BI_D4 704 and BI_D3 706 (now containing signals originally received on RX_D2 702) will have their EOPs detected and compared 784. As BI_D4 704 is not swapped, and the signals originally received on RX_D2 702 are now on the correct channel (BI_D3 706), the comparison will indicate no pair swapping, and the subsequently received signals will be passed unchanged 790.

As will be apparent to those of ordinary skill in the art, the preceding description of a possible operation of the method is but one of many potential pair swapping situations that may be encountered and corrected by the apparatus and method.

The steps of detecting and comparing the received EOPs on each signal pair 756, 770, 784 are accomplished by sensing the EOP data symbol patterns and therefore EOP code groups appended to the data stream on each signal pair 702, 704, 706. This detection allows a determination 758, 772, 786 to be made regarding whether the signal pairs BI_D4 704 and BI_D3 706 are swapped. This is accomplished by detecting the ordering of the EOP code groups. Turning again to FIG. 2A and 2B, the ordering (and thus the identity) of the signal pairs 702/52, 704/54, 706/56 can be determined by the location of the EOP code groups 76, 78, 80, 82, 84. As the pair RX_D2 702, 52 will be identified by the presence of a link integrity signal, the EOP code groups 76, 78, 80, 82, 84 appended to signal pair RX_D2 702, 52 can be used as the basis for identifying the other two pairs 704, 54, 706, 56, as the expected ordering of the EOPs will then be known. For example, if RX_D2 702, 52 is detected with EOP_2 78 and EOP_5 84 appended to the data stream, then signal pair BI_D4 704, 54 will be expected to contain EOP_3 80. If BI_D4 704, 54 instead contains EOP_1 and EOP_4, then signal pairs BI_D4 704, 54 and BI_D3 706, 56 have been swapped. Similarly, if RX_D2 702, 52 is detected with EOP_1 76 and EOP_4 82 appended to the data stream, then BI_D4 704, 54 will be expected to contain EOP_2 78 and EOP_5 84—and BI_D3 706, 56 will be expected to contain EOP_3 80. The incorrect location of the EOPs will indicate pair swap.

As will be apparent to those of ordinary skill in the art, the steps of detecting and comparing the packet EOPs 756, 770, 784 could be implemented in a similar fashion for other protocols and data communications systems; the above description is intended to be illustrative rather than limiting.

Figure 10C:
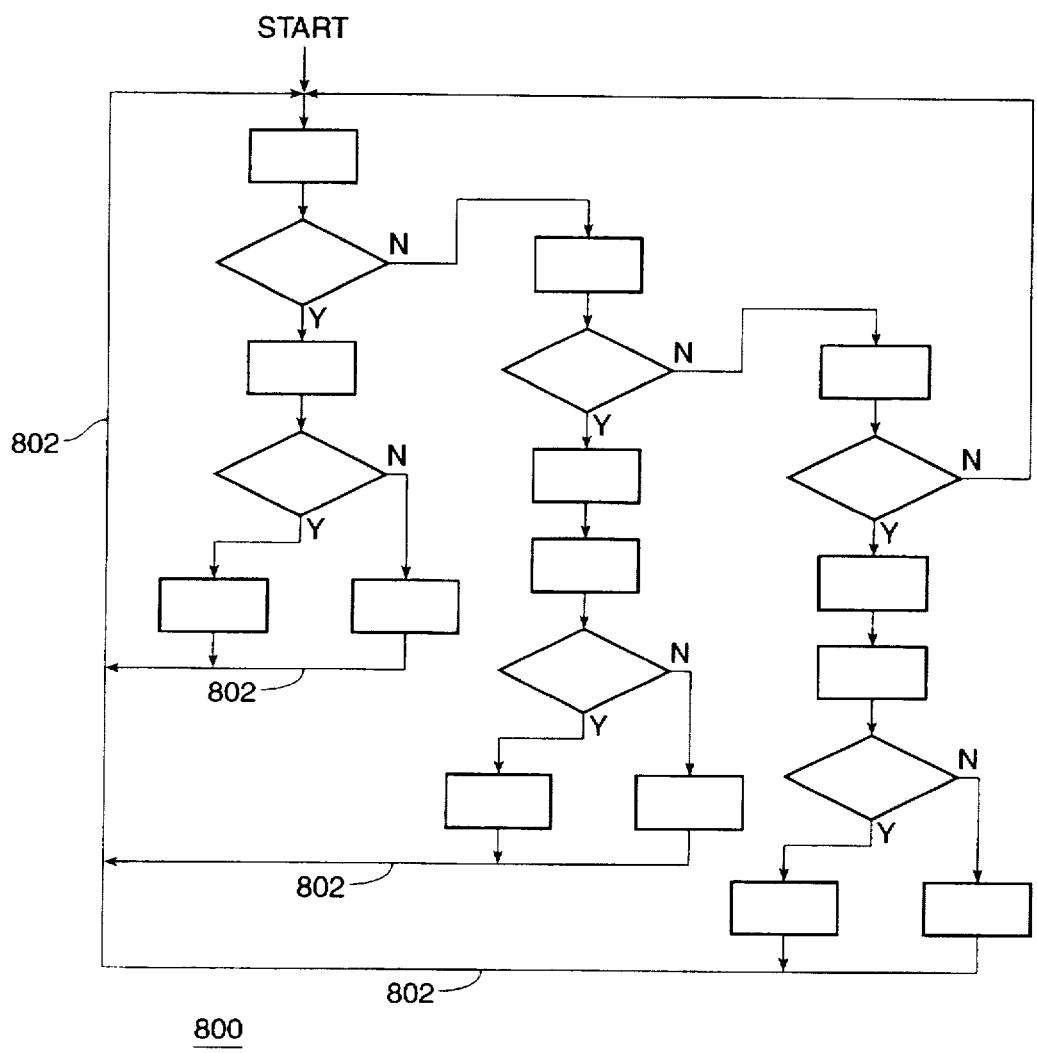
FIG. 10C is a diagram showing a method for detecting and correcting for pair swap utilizing EOPs as shown in FIG. 10B with the addition of a cyclical function to allow for continuous detection and correction of pair swap.

Typical implementation of the preferred embodiment of this aspect of the invention 750 will be as part of a device used to set the mode of operation of a multiple channel receiving device rather than as a continuous method. That is, the apparatus and methods depicted in FIG. 10A and FIG. 10B will be operated when activated, perhaps at the initial 'power-up' of the receiving device, or initial connection of wiring or other transmission media, and will otherwise be a passive element in the receiving circuitry. It will be apparent to those of ordinary skill in the art, however, that the embodiments of the invention described in FIG. 10A and FIG. 10B above would be effective in continuous operation as well. FIG. 10C depicts the method for detecting and correcting for pair swap 800 as shown 750 in FIG. 10B with the addition of a cyclical function 802 to allow for continuous detection and correction of pair swap. The operation of the method will otherwise be as described in FIG. 10B.

III. IMPLEMENTATION OF A LINK INTEGRITY FUNCTION

The third aspect of the present invention is the implementation of a link integrity function. This aspect of the invention again uses combinations of link integrity signals and non-data components of received packets to implement this function for all signal pairs or channels.

Figure 11A:
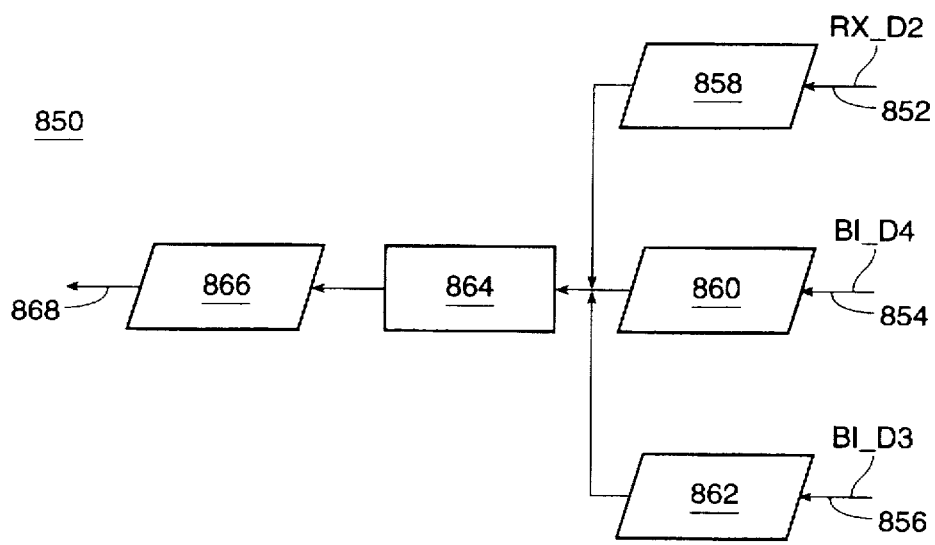
FIG. 11A is a diagram showing an embodiment of the present invention, configured to implement a link integrity function for a 100BASE-T4 Ethernet system.

FIG. 11A depicts a preferred embodiment of this aspect of the present invention, configured to implement a link integrity function for the three signal pairs in a 100BASE-T4 Ethernet system. While FIG. 11A and the following description are directed towards implementation of a link integrity function for a 100BASE-T4 system, it will be apparent to those of ordinary skill in the art that this aspect of the present invention will be fully applicable to other packet-based data communications systems.

Turning to FIG. 11A, the apparatus implementing a link integrity function for 100BASE-T4 850 accepts inputs from the three received signal pairs, RX_D2 852, BI_D4 854, and BI_D3 856. The inputs 852, 854, 856 are received by a receiving device 858, 860, 862, and operated upon by a method for implementing a link integrity function for 100BASE-T4 864. The output 868 of the device 850 is a signal indicating the link integrity status ('pass' or 'fail'); the output 868 is typically sent by a transmitting device 866. In typical operation, the output 868 (and therefore link integrity status) will be used by an external signaling mechanism to alert a system user to the link integrity status, though those of ordinary skill in the art will recognize that the output 868 could also have other uses. The apparatus implementing a link integrity function for 100BASE-T4 850 then, allows the receiving device to recognize and signal conditions of bad link integrity, such as would ordinarily occur with broken wires or transmission media, or poor electrical connections.

Figure 11B:
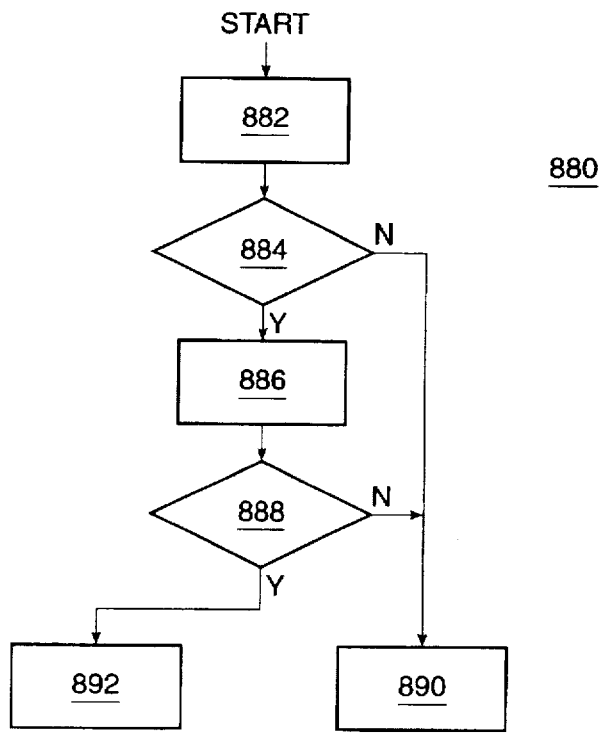
FIG. 11B is a diagram showing a method according to the present invention, for implementing a link integrity function for a 100BASE-T4Ethernet system, as shown in FIG. 11A.

FIG. 11B depicts a method according to this aspect of the present invention, used to implement a link integrity function in 100BASE-T4 Ethernet systems. While FIG. 11B and the following description are directed towards implementation of a link integrity function for a 100BASE-T4 system, it will be apparent to those of ordinary skill in the art that this aspect of the present invention will be fully applicable to other packet-based data communications systems.

Turning to FIG. 11B, the method for implementing a link integrity function in 100BASE-T4 Ethernet 880 operates as follows. First, received signal pair RX_D2 852 is sensed for the presence of a link integrity signal 882. As the 100BASE-T4 protocol defines RX_D2 852 with a link integrity signal, the presence of a link integrity signal will establish link integrity on RX_D2 852. If the link integrity signal is determined not to be present 884, then link integrity has failed 890, and the output signal 868 will so indicate. If, however, the link integrity signal is present, then the next step will be to sense for the arrival of packets on all three signal pairs 886. A determination is then made regarding the link integrity of BI_D4 854 and BI_D3 856 888 based on the arrival of packets. The 100BASE-T4 Ethernet protocol defines a maximum time delay between valid packet arrival on each signal pair (in the present example, this maximum time delay is 60 ns). In the presently preferred embodiment of the invention, packets on BI_D4 854 and BI_D3 856 must arrive within 60 ns of packets arriving on RX_2 852. It will, however, be apparent to those of ordinary skill in the art that higher time delay values could be used, subject only to a maximum limit of the minimum length of received packets (64 bytes or 15360 ns in the T4 case). As RX_D2 852 has already been determined to have link integrity 884, it can be used as the basis for determining link integrity 888 on the other signal pairs 854, 856. If valid packets do not arrive on both BI_D4 854 and BI_D3 856 within the designated time window, then link integrity has failed 890 and the output signal 868 will so indicate. If, however, valid packets do arrive on both BI_D4 854 and BI_D3 856 within the designated time window, then link integrity is established for all three signal pairs 892, and the output signal 868 will so indicate.

It will be apparent to those of ordinary skill in the art that the above method does not require the use of valid packets on the received signal pairs or channels—valid data signals would also be sufficient. The presently-preferred embodiment utilizes valid packets, but the invention does not require them. If valid data signals were instead used, those of ordinary skill in the art would realize that the method described above would be otherwise unchanged.

Though the description above is directed towards a method for implementing a link integrity function in 100BASE-T4 Ethernet systems, those of ordinary skill in the art will realize that the method is fully applicable to other packet-based data communications systems. Furthermore, those of ordinary skill in the art will recognize that the method described above could be replicated in order to be applied to systems with any number of signal pairs, provided that at least one signal pair contains a link integrity signal. The above description is also fully illustrative to those of ordinary skill in the art of methods that may be used to implement a link integrity function in systems improving upon or developing from the 100BASE-T4 Ethernet protocol.

Figure 11C:
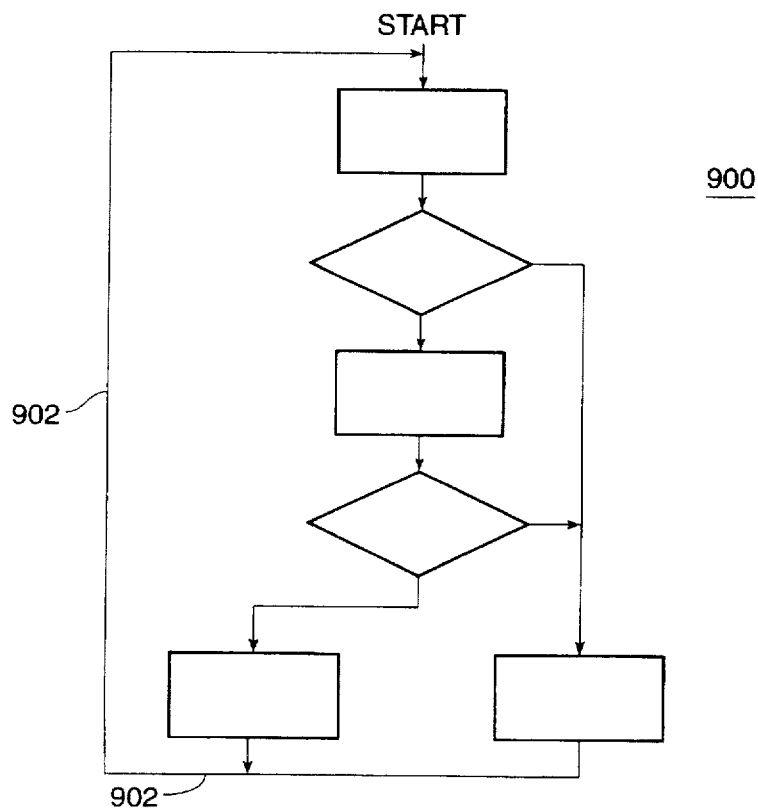
FIG. 11C is a diagram showing a method according to the present invention, for implementing a link integrity function for a 100BASE-T4Ethernet system, as shown in FIG. 11B, with the addition of a cyclical function to allow for continuous detection and correction of pair swap.

In the preferred embodiment of the apparatus and method for implementing a link integrity function described above in FIGS. 11A and 11B, the apparatus and method is typically used as a "mode setting" function—the link integrity function is typically implemented only when signaled by external circuitry (normally at "power-up" or at the connection of wiring). It will be apparent to those of ordinary skill in the art, however, that the apparatus and method for implementing a link integrity function described above in FIGS. 11A and 11B could also be used to implement a link integrity function on a continuous basis. FIG. 11C depicts such a method for implementing a link integrity function on a continuous basis. The only distinction from the method depicted in FIG. 11B is the addition of a cyclical function 902, allowing the link integrity function to be implemented continuously. The apparatus and method will otherwise operate as in FIG. 11B.

While embodiments, aspects, and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. A method for detecting and correcting for pair swap in a packet-based data communications system comprising the steps of:

receiving inputs from a plurality of signal pairs, at least one of which is defined to carry a repetitive non-data signal when not carrying data packets;

sensing for said repetitive non-data signal on each said signal pair;

identifying said signal pairs defined to carry a repetitive non-data signal, said identification accomplished by said sensing for said repetitive non-data signal;

selectively switching data signals received on a signal pair not defined to carry a repetitive non-data signal with the data signals received on a signal pair defined to carry a repetitive non-data signal in response to said identification of said signal pairs defined to carry a repetitive non-data signal;

detecting the non-data components of received packets on each of said signal pairs;

comparing, on each of said signal pairs, the received symbol pattern of said non-data components of received packets to the received symbol pattern of the non-data components of received packets on other signal pairs and to the expected symbol pattern of said non-data components of received packets;

identifying each said signal pair not defined to carry a repetitive non-data signal, said identification accomplished by said comparisons of received symbol patterns of said non-data components of received packets;

selectively switching data signals received on one said signal pair not defined to carry a repetitive non-data signal with data signals received on another said signal pair not defined to carry a repetitive non-data signal in response to said identification of said signal pairs not defined to carry a repetitive non-data signal.

2. The method for detecting and correcting for pair swap in a packet-based data communications system according to claim 1 wherein said non-data components are packet preambles.

3. The method for detecting and correcting for pair swap in a packet-based data communications system according to claim 1 wherein said non-data components are end-of-packet delimiters (EOPs).

4. The method for detecting and correcting for pair swap in a packet-based data communications system according to claim 1 additionally comprising the step of passing said received packets on each of said signal pairs to subsequent circuitry.

5. A method for detecting and correcting for pair swap in a packet-based data communications system comprising the steps of:

receiving inputs from a plurality of signal pairs, at least one of which is defined to carry a repetitive non-data signal when not carrying data packets;

sensing for said repetitive non-data signal on each said signal pair;

identifying said signal pairs defined to carry a repetitive non-data signal, said identification accomplished by said sensing for said repetitive non-data signal;

selectively switching data signals received on a signal pair not defined to carry a repetitive non-data signal with the data signals received on a signal pair defined to carry a repetitive non-data signal in response to said identification of said signal pairs defined to carry a repetitive non-data signal;

detecting the end-of-packet delimiters (EOPs) of received packets on each of said signal pairs;

comparing, on each of said signal pairs, the ordering of received EOP code groups with the ordering of received EOP code groups on other signal pairs and to the expected ordering of the EOP code groups of received packets;

identifying each said signal pairs not defined to carry a repetitive non-data signal, said identification accomplished by said comparisons of received symbol patterns of said non-data components of received packets;

selectively switching data signals received on one said signal pair not defined to carry a repetitive non-data signal with data signals received on another said signal pair not defined to carry a repetitive non-data signal in response to the identification of said signal pairs not defined to carry a repetitive non-data signal.

6. The method for detecting and correcting for pair swap in a packet-based data communications system according to claim 5 additionally comprising the step of passing said received packets on each of said signal pairs to subsequent circuitry.

7. A method for detecting and correcting for pair swap in an Ethernet system comprising the steps of:

receiving inputs from three signal pairs, one of which is defined to carry a link integrity signal when not carrying data packets;

sensing for said link integrity signal on each said signal pair;

identifying said signal pair defined to carry a link integrity signal, said identification accomplished by said sensing for said link integrity signal;

selectively switching data signals received on a signal pair not defined to carry a link integrity signal with the data signals received on said signal pair defined to carry a link integrity signal in response to said identification of said signal pair defined to carry a link integrity signal;

detecting the non-data components of received packets on each of said signal pairs;

comparing, on each of said signal pairs, the received symbol pattern of said non-data components of received packets to the received symbol pattern of the non-data components of received packets on other signal pairs and to the expected symbol pattern of said non-data components of received packets;

identifying each said signal pair not defined to carry a link integrity signal, said identification accomplished by said comparisons of received symbol patterns of said non-data components of received packets;

selectively switching data signals received on one said signal pair not defined to carry a link integrity signal with data signals received on another said signal pair not defined to carry a link integrity signal in response to said identification of said signal pairs not defined to carry a link integrity signal.

8. The method for detecting and correcting for pair swap in an Ethernet system according to claim 7 wherein said non-data components are packet preambles.

9. The method for detecting and correcting for pair swap in an Ethernet system according to claim 7 wherein said non-data components are end-of-packet delimiters (EOPs).

10. The method for detecting and correcting for pair swap in an Ethernet system according to claim 7 additionally comprising the step of passing said received packets on each of said signal pairs to subsequent circuitry.

11. A method for detecting and correcting for pair swap in an Ethernet system comprising the steps of:

receiving inputs from three signal pairs, one of which is defined to carry a link integrity signal when not carrying data packets;

sensing for said link integrity signal on each said signal pair;

identifying said signal pair defined to carry a link integrity signal, said identification accomplished by said sensing for said link integrity signal;

selectively switching data signals received on a signal pair not defined to carry a link integrity signal with the data signals received on said signal pair defined to carry a link integrity signal in response to said identification of said signal pair defined to carry a link integrity signal;

detecting the end-of-packet delimiters (EOPs) of received packets on each of said signal pairs;

comparing, on each of said signal pairs, the ordering of received EOP code groups with the ordering of received EOP code groups on other signal pairs and to the expected ordering of the EOP code groups of received packets;

identifying each said signal pair not defined to carry a link integrity signal, said identification accomplished by said comparisons of received symbol patter of said non-data components of received packets;

selectively switching data signals received on one said signal pair not defined to carry a link integrity signal with data signals received on another said signal pair not defined to carry a link integrity signal in response to said identification of said signal pairs not defined to carry a link integrity signal.

12. The method for detecting and correcting for pair swap in an Ethernet system according to claim 11 additionally comprising the step of passing said received packets on each of said signal pairs to subsequent circuitry.

13. A pair swap detection and correction apparatus comprising:

a receiver, said receiver capable of receiving inputs from data packets and repetitive non-data signals on a plurality of signal pairs;

a device implementing pair swap detection and correction, said device implementing pair swap detection and correction capable of sensing for said repetitive non-data signals; capable of identifying signal pairs defined to carry a repetitive non-data signal; capable of selectively switching data signals received on one signal pair with data signals received on another signal pair; capable of detecting the non-data components of received packets; capable of comparing the received symbol pattern of said non-data components of received packets to the received symbol pattern of said non-data components of received packets of other signal pairs and to the expected symbol pattern of said non-data components of received packets; and capable of identifying each signal pair not defined to carry a repetitive non-data signal;

a transmitter, said transmitter capable of transmitting said received data packets on a plurality of signal pairs to subsequent circuitry.

14. The pair swap detection and correction apparatus according to claim 13 wherein said non-data components of received packets are packet preambles.

15. The pair swap detection and correction apparatus according to claim 13 wherein said non-data components of received packets are end-of-packet delimiters (EOPs).

16. A pair swap detection and correction apparatus comprising:

a receiver, said receiver capable of receiving inputs from data packets and repetitive non-data signals on a plurality of signal pairs;

a device implementing pair swap detection and correction, said device implementing pair swap detection and correction capable of sensing for said repetitive non-data signals; capable of identifying signal pairs defined to carry a repetitive non-data signal; capable of selectively switching data signals received on one signal pair with data signals received on another signal pair; capable of detecting the non-data components of received packets; capable of comparing the received symbol pattern of said non-data components of received packets to the received symbol pattern of said non-data components of received packets of other signal pairs and to the expected symbol pattern of said non-data components of received packets; and capable of identifying each signal pair not defined to carry a repetitive non-data signal;

a transmitter, said transmitter capable of transmitting said received data packets on a plurality of signal pairs to subsequent circuitry.

17. A method for implementing a link integrity function in a packet-based data communications system comprising the steps of:

receiving inputs from a plurality of signal pairs, at least one of which is defined to carry a repetitive non-data signal when not carrying data packets;

sensing for said repetitive non-data signal on said signal pairs defined to carry a repetitive non-data signal;

selectively indicating the lack of link integrity in response to said sensing for said repetitive non-data signal;

detecting the non-data components of received packets on each of said signal pairs;

determining whether the non-data components of received packets on each of said signal pairs not defined to carry a repetitive non-data signal are received within a specified time period of the arrival of the non-data components of received packets on any of said signal pairs defined to carry a repetitive non-data signal;

selectively indicating the lack of link integrity in response to said determination of whether the non-data components of received packets on each of said signal pairs not defined to carry a repetitive non-data signal are received within a specified time period of the arrival of the non-data components of received packets on any of said signal pairs defined to carry a repetitive non-data signal.

18. The method for for implementing a link integrity function in a packet-based data communications system according to claim 17 wherein said non-data components are packet preambles.

19. The method for implementing a link integrity function in a packet-based data communications system according to claim 17 wherein said non-data components are end-of-packet delimiters (EOPs).

20. The method for implementing a link integrity function in a packet-based data communications system according to claim 17 additionally comprising the step of passing a link integrity status signal to other circuitry.

21. A method for implementing a link integrity function in an Ethernet system comprising the steps of:

receiving inputs from three signal pairs, one of which is defined to carry a link integrity signal when not carrying data packets;

sensing for said link integrity signal on said signal pair defined to carry a link integrity signal;

selectively indicating the lack of link integrity in response to said sensing for said link integrity signal;

detecting the non-data components of received packets on each of said signal pairs;

determining whether the non-data components of received packets on each of said signal pairs not defined to carry a link integrity signal are received within a specified time period of the arrival of the non-data components of received packets on said signal pair defined to carry a link integrity signal;

selectively indicating the lack of link integrity in response to said determination of whether the non-data components of received packets on each of said signal pairs not defined to carry a link integrity signal are received within a specified time period of the arrival of the non-data components of received packets on said signal pair defined to carry a link integrity signal.

22. The method for implementing a link integrity function in an Ethernet system according to claim 21 wherein said non-data components are packet preambles.

23. The method for implementing a link integrity function in an Ethernet system according to claim 21 wherein said non-data components are end-of-packet delimiters (EOPs).

24. The method for implementing a link integrity function in an Ethernet system according to claim 21 additionally comprising the step of passing a link integrity status signal to other circuitry.

25. A method for implementing a link integrity function in a packet-based data communications system comprising the steps of:

receiving inputs from a plurality of signal pairs, at least one of which is defined to carry a repetitive non-data signal when not carrying data packets;

sensing for said repetitive non-data signal on said signal pairs defined to carry a repetitive non-data signal;

selectively indicating the lack of link integrity in response to said sensing for said repetitive non-data signal;

detecting the arrival of valid data signals on each of said signal pairs;

determining whether arrival of valid data signals on each of said signal pairs not defined to carry a repetitive non-data signal occurs within a specified time period of the arrival of valid data signals on any of said signal pairs defined to carry a repetitive non-data signal;

selectively indicating the lack of link integrity in response to said determination of whether arrival of valid data signals on each of said signal pairs not defined to carry a repetitive non-data signal occurs within a specified time period of the arrival of valid data signals on any of said signal pairs defined to carry a repetitive non-data signal.

26. The method for implementing a link integrity function in a packet-based data communications system according to claim 25 additionally comprising the step of passing a link integrity status signal to other circuitry.

27. A method for implementing a link integrity function in an Ethernet system comprising the steps of:

receiving inputs from three signal pairs, one of which is defined to carry a link integrity signal when not carrying data packets;

sensing for said link integrity signal on said signal pair defined to carry a link integrity signal;

selectively indicating the lack of link integrity in response to said sensing for said link integrity signal;

detecting the arrival of valid data signals on each of said signal pairs;

determining whether arrival of valid data signals on each of said signal pairs not defined to carry a link integrity signal occurs within a specified time period of the arrival of valid data signals on said signal pair defined to carry a link integrity signal;

selectively indicating the lack of link integrity in response to said determination of whether arrival of valid data signals on each of said signal pairs not defined to carry a link integrity signal occurs within a specified time period of the arrival of valid data signals on said signal pair defined to carry a link integrity signal;

transmitting a link integrity status indicator signal.

28. The method for implementing a link integrity function in an Ethernet system according to claim 27 additionally comprising the step of passing a link integrity status signal to other circuitry.

29. A link integrity apparatus comprising:

a receiver, said receiver capable of receiving inputs from data packets and repetitive non-data signals on a plurality of signal pairs;

a device implementing a link integrity function, said device implementing a link integrity function capable of sensing for repetitive non-data signals, capable of selectively indicating the lack of link integrity, capable of detecting the non-data components of received packets, capable of determining whether non-data components of received packets on each signal pair not defined to carry repetitive non-data signals are received within a specified time period of the arrival of the non-data components of received packets on signal pairs defined to carry a repetitive non-data signal, and capable of selectively indicating the lack of link integrity;

a transmitter, said transmitter capable of transmitting a link integrity status indicator signal.

30. The link integrity apparatus according to claim 29 wherein said non-data components of received packets are packet preambles.

31. The link integrity apparatus according to claim 29 wherein said non-data components of received packets are end-of-packet delimiters (EOPs).

32. A link integrity apparatus comprising:

a receiver, said receiver capable of receiving inputs from data packets and valid data signals on a plurality of signal pairs;

a device implementing a link integrity function, said device implementing a link integrity function capable of sensing for repetitive non-data signals, capable of selectively indicating the lack of link integrity, capable of detecting valid data signals, capable of determining whether valid data signals on each signal pair not defined to carry repetitive non-data signals are received within a specified time period of the arrival of the valid data signals on signal pairs defined to carry a repetitive non-data signal, and capable of selectively indicating the lack of link integrity;

a transmitter, said transmitter capable of transmitting a link integrity status indicator signal.

* * * * *